(12) United States Patent
Kim et al.

(10) Patent No.: US 11,675,537 B2
(45) Date of Patent: Jun. 13, 2023

(54) CONTROLLER FOR PERFORMING DATA INPUT/OUTPUT OPERATION AND MEMORY MANAGEMENT OPERATION AT THE SAME TIME AND OPERATION METHOD THEREOF

(71) Applicant: SK hynix Inc., Icheon-si (KR)

(72) Inventors: Ju Hyun Kim, Icheon-si (KR); Do Hun Kim, Icheon-si (KR); Jin Yeong Kim, Icheon-si (KR); Kee Bum Shin, Icheon-si (KR); Jae Wan Yeon, Icheon-si (KR); Kwang Sun Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 32 days.

(21) Appl. No.: 17/227,140

(22) Filed: Apr. 9, 2021

(65) Prior Publication Data

US 2022/0156002 A1 May 19, 2022

(30) Foreign Application Priority Data

Nov. 18, 2020 (KR) .................. 10-2020-0154440

(51) Int. Cl.
*G06F 3/06* (2006.01)
(52) U.S. Cl.
CPC ............ *G06F 3/0659* (2013.01); *G06F 3/061* (2013.01); *G06F 3/0679* (2013.01)
(58) Field of Classification Search
CPC ...... G06F 3/061; G06F 3/0659; G06F 3/0679; G06F 3/0613; G06F 3/0631; G06F 3/0658; G06F 11/1008; G06F 12/0246; G06F 12/0253; G06F 12/0292; G06F 13/1615; G06F 13/28; G06F 2212/7201; G06F 2212/7205; G06F 2212/7208; Y02D 10/00
See application file for complete search history.

(56) References Cited

U.S. PATENT DOCUMENTS

| 9,262,098 B2 | 2/2016 | Chung et al. | |
| 2008/0177937 A1* | 7/2008 | Nishihara | G06F 12/0246 |
| | | | 711/E12.008 |
| 2013/0191609 A1* | 7/2013 | Kunimatsu | G06F 3/0638 |
| | | | 711/202 |

(Continued)

FOREIGN PATENT DOCUMENTS

KR 20190003911 A 1/2019

*Primary Examiner* — Larry T Mackall
(74) *Attorney, Agent, or Firm* — Perkins Coie LLP

(57) ABSTRACT

A controller for controlling a memory device is provided to include: a request receiver configured to receive a request including a logical address from a host; a dependency checker configured to acquire the request from the request receiver and check a dependency of the request; a map manager configured to generate a command including a physical address mapped to the logical address of the request in response to a result of checking that the request has no dependency on the prior incomplete request; and a command submitter configured to provide the memory device with the command generated by the map manager, wherein the request receiver, the dependency checker, the map manager and the command submitter are structured to configure a data pipeline such that operations of the request receiver, the dependency checker, the map manager, and the command submitter deliver are performed in series.

25 Claims, 14 Drawing Sheets

(56) References Cited

U.S. PATENT DOCUMENTS

| | | | | |
|---|---|---|---|---|
| 2014/0129761 A1* | 5/2014 | Kwon | ............... | G06F 12/0246 711/103 |
| 2018/0173418 A1* | 6/2018 | Li | ...................... | G06F 3/0656 |

* cited by examiner

CONTROLLER FOR PERFORMING DATA INPUT/OUTPUT OPERATION AND MEMORY MANAGEMENT OPERATION AT THE SAME TIME AND OPERATION METHOD THEREOF

CROSS-REFERENCE TO RELATED APPLICATION

This patent document claims priority and benefits to Korean Patent Application No. 10-2020-0154440 filed on Nov. 18, 2020, which is incorporated herein by reference in its entirety.

TECHNICAL FIELD

Various embodiments of the disclosed technology relate to a controller for controlling a memory device.

BACKGROUND

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

As memory systems do not need a mechanical driving part, the memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments are directed to a controller which can improve the performance of a memory system by performing a data input/output (I/O) operation and a memory management operation at the same time, and an operation method thereof.

Also, various embodiments are directed to a controller which can improve the throughput of a data I/O operation using a pipeline, and an operation method thereof.

In one aspect, a controller for controlling a memory device is provided to include: a request receiver suitable for receiving a request including a logical address from a host; a dependency checker suitable for determining whether the request acquired from the request receiver has dependency on an uncompleted request; a map manager suitable for generating a command for a physical address mapped to the logical address of a request having no dependency; and a command submitter suitable for providing the memory device with the command acquired from the map manager, wherein the request receiver, the dependency checker, the map manager and the command submitter are operated in a pipeline manner.

In another aspect, a controller for controlling a memory device is provided to include: a request receiver configured to receive a request including a logical address from a host operatively coupled to the controller; a dependency checker configured to acquire the request from the request receiver and check a dependency of the request, the dependency indicating whether there exists any prior incomplete request that affects to processing of the request; a map manager configured to generate a command including a physical address mapped to the logical address of the request in response to a result of checking that the request has no dependency on the prior incomplete request; and a command submitter configured to provide the memory device with the command generated by the map manager, wherein the request receiver, the dependency checker, the map manager and the command submitter are structured to configure a data pipeline such that operations of the request receiver, the dependency checker, the map manager, and the command submitter deliver are performed in series.

The request receiver may include: a host tensor processing unit (TPU) configured to determine a type of the request as a write request or a read request and provide the request to a write input/output (I/O) TPU or the read request a read I/O TPU based on the type of the request; the write I/O TPU configured to slice the write request into a plurality of requests, and provide the plurality of sliced requests to the dependency checker; and the read I/O TPU configured to provide the read request to the dependency checker.

The map manager may include: a host read TPU configured to search for a physical address corresponding to the logical address of the request that corresponds to a read request; and a post TPU configured to generate a read command corresponding to the read request based on the searched physical address.

The command submitter may include: a channel TPU configured to control a channel direct memory access (DMA) to provide the read command to the memory device; a read path TPU configured to control a read path to acquire read data corresponding to the read command from the memory device, and to perform error correction code (ECC) decoding on the acquired read data; and a flash interface layer (FIL) core configured to control the read path TPU and the channel TPU.

The controller may further include: a central processing unit (CPU) configured to perform an address mapping operation to generate map data by mapping a logical address of a host to a physical address of the memory device; and a memory configured to store a map table including the map data.

The dependency checker may include a check TPU configured to check the dependency of the request on an incomplete trim request and request the CPU to perform a corresponding operation to the request that has been checked as having dependency on the incomplete trim request.

The check TPU may be configured to check that the request has dependency on the incomplete trim request in case that the logical address of the request is same as the logical address of the uncompleted trim request.

The CPU may be configured to delay processing of the request until the incomplete trim request is completely processed in case that the request corresponds to a write request.

The CPU may be configured to provide, to the host, a response indicating that a logical address corresponding to the request has been trimmed.

The dependency checker may include a write cache TPU configured to request the CPU to perform a corresponding operation to the request that has been checked as having dependency on an incomplete write request.

The write cache may be configured to check that the request has dependency on the incomplete write request in case that the logical address of the request is same as the logical address of the uncompleted write request.

The CPU may be configured to delay processing of the request until the incomplete write request is completely processed in case that the request corresponds to a write request.

The CPU may be configured to search data associated with the incomplete write request in the memory in case that the request corresponds to a read request.

The CPU may determine a physical address of a memory region in the memory device, to which at least a part of the map table is to be programmed, and generate a map flush request including the physical address.

The map manager may include: a map flush TPU configured to update the map table using the physical address determined by the CPU; and a post TPU configured to generate a write command corresponding to the map flush request based on the determined physical address.

The controller may further include a write aggregator configured to aggregate write requests to stripe write data associated with write requests that have been checked as having no dependency on the prior incomplete request, and provide the CPU with an address mapping request for the aggregated write requests.

The controller may further comprising one or more dependency checkers and write aggregators, wherein the one or more dependency checkers are operated in parallel, and the one or more write aggregators are operated in parallel.

The write aggregator may include: a write queue TPU configured to queue write requests acquired from the dependency checker; and a flush TPU configured to aggregate the queued write requests by striping write data of the queued write request, and provide the aggregated write requests to the CPU.

The flush TPU may be configured to stripe the write data by determining some of addresses of data chunks included in the write data, the data chunks programmed to a plurality of memory dies included in the memory device.

The CPU may generate map data by mapping the logical addresses of the aggregated write requests to physical addresses of the memory device in response to the address mapping request.

The map manager may include: a write TPU configured to update the map table using the map data generated by the CPU; and a post TPU configured to generate a write command corresponding to the write request based on the mapped physical address.

The command submitter may include: a write path TPU configured to control a write path to acquire write data corresponding to the write command, and to perform an error correction code encoding on the acquired write data; a channel TPU configured to control a channel direct memory access (DMA) to provide the memory device with the write command and data from the write path; and a flash interface layer (FIL) core configured to control the write path TPU and the channel TPU.

The CPU may i) determine a source block and destination block of a garbage collection operation, ii) generate a read request for the source block and provide the generated read request to the map manager, and iii) generate, in response to buffering in the memory of data associated with the read request, a write request for the destination block and provide the generated write request to the write aggregator.

The map manager may further include a garbage collection read TPU configured to search a physical address corresponding to the logical address of a garbage collection read request from the CPU by referring to the map table.

The controller may further include a host DMA configured to perform a data input/output (I/O) operation between the host and the memory without interventions of the CPU, the request receiver, the dependency checker, the map manager and the command submitter.

In accordance with the present embodiments, it is possible to provide a controller which can improve the performance of a memory system by performing a data I/O operation and a memory management operation at the same time, and an operation method thereof.

Furthermore, it is possible to a controller which can improve the throughput of a data I/O operation using a pipeline, and an operation method thereof.

DETAILED DESCRIPTION

Hereafter, various embodiments of the disclosed technology will be described in detail with reference to the accompanying drawings.

Figure 1:
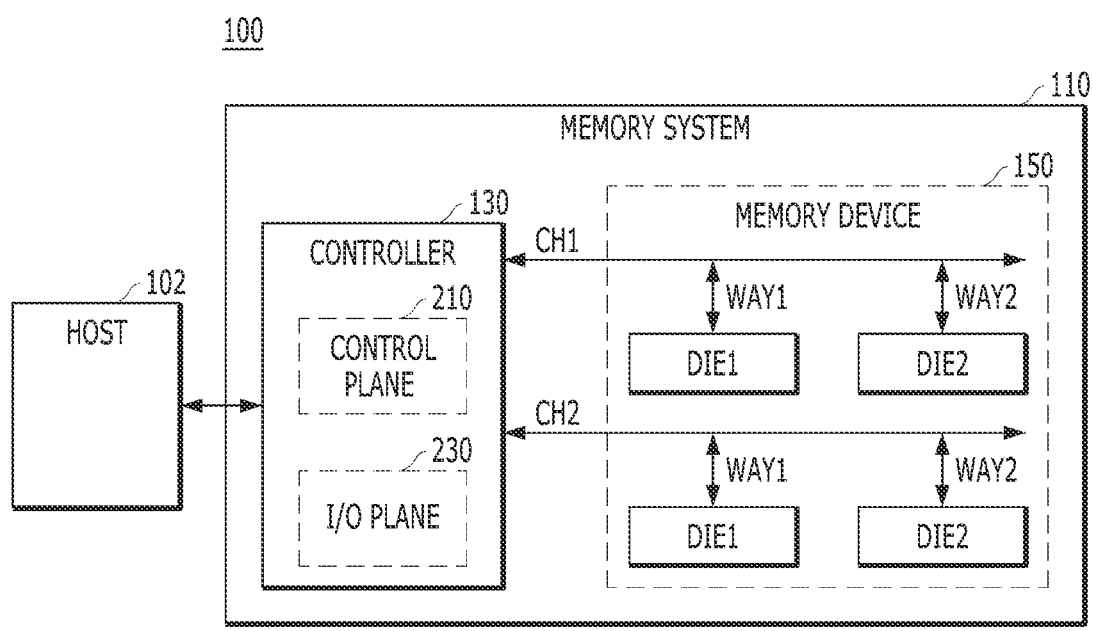
FIG. 1 is a diagram schematically illustrating an example of a data processing system including a memory system in accordance with an embodiment of the disclosed technology.

FIG. 1 is a block diagram illustrating a data processing system 100 in accordance with an embodiment of the disclosed technology.

Referring to FIG. 1, the data processing system 100 may include a host 102 operatively coupled to a memory system 110 in communication with the host 102.

The host 102 may include any of various portable electronic devices such as a mobile phone, MP3 player and laptop computer, or any of various non-portable electronic devices such as a desktop computer, a game machine, a television (TV), or a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request from the host 102. Non-limiting examples of the memory system 110 may include a solid state drive (SSD), a multi-media card (MMC), a secure digital (SD) card, a universal serial bus (USB) device, a universal flash storage (UFS) device, compact flash (CF) card, a smart media card (SMC), or a personal computer memory card international association (PCMCIA) card and memory stick. The MMC may include an embedded MMC (eMMC), reduced size MMC (RS-MMC), micro-MMC, or others. The SD card may include a mini-SD card and/or micro-SD card.

The memory system 110 may be embodied as various types of storage devices. Examples of such storage devices may include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM), or a flash memory. The flash memory may have a 3-dimensional (3D) stack structure.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device. For example, the controller 130 and the memory device 150 may be integrated as one semiconductor device to configure a solid state drive (SSD). When the memory system 110 is implemented as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a program operation, and provide data stored therein to the host 102 through a read operation.

The memory device 150 may include a plurality of memory dies DIE1 and DIE2 coupled to the controller 130 through a plurality of ways WAY1 and WAY2 and a plurality of channels CH1 and CH2.

The memory device 150 may include a flash memory device. The flash memory device may store data in a memory cell array including memory cell transistors. The flash memory device may have a hierarchical structure of memory die, plane, memory block and page. One memory die may receive one command at a time. The flash memory may include a plurality of memory dies. One memory die may include a plurality of planes, and the plurality of planes may process commands received by the memory die in parallel. Each of the planes may include a plurality of memory blocks. The memory block may correspond to the minimum unit of an erase operation. One memory block may include a plurality of pages. The page may correspond to the minimum unit of a write operation.

A memory cell may be referred to as a single-level cell (SLC), a multi-level cell (MLC), a triple-level cell (TLC), or a quad depending on the number of bits which can be stored in one memory cell.

Depending on the level of the memory cell, memory cells coupled to one word line may include a plurality of logical pages. For example, each word line of a TLC memory block may be associated with an MSB (Most Significant Bit) page, a CSB (Central Significant Bit) page and an LSB (Least Significant Bit) page as logical pages.

In accordance with an embodiment of the disclosed technology, the memory device 150 is described as a nonvolatile memory, such as a flash memory, e.g., a NAND flash memory. However, the memory device 150 may be realized in various forms such as a Phase Change Random Access Memory (PCRAM), a Resistive Random Access Memory (RRAM or ReRAM), a Ferroelectric Random Access Memory (FRAM), or a Spin Transfer Torque Magnetic Random Access Memory (STT-RAM or STT-MRAM).

Figure 2:
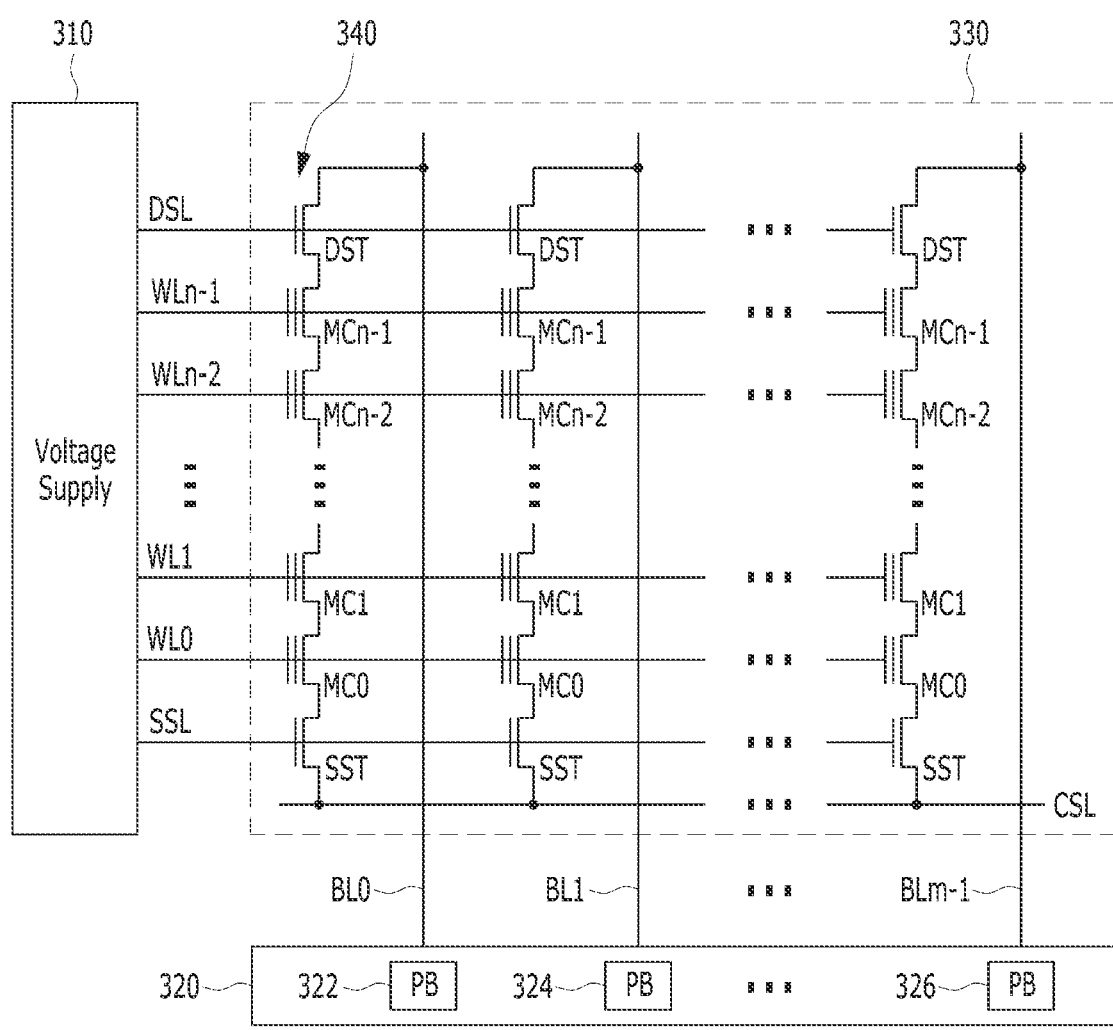
FIG. 2 is a circuit diagram illustrating an exemplary configuration of a memory cell array within a memory device.

FIG. 2 is a circuit diagram illustrating an exemplary configuration of the memory cell array within the memory device 150.

Referring to FIG. 2, a memory block 330 included in the memory device 150, may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells or memory cell transistors MC0 to MCn−1 may be coupled in series. In an embodiment, each of the memory cells MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 2, the first cell string is coupled to the first bit line BL0, and the last cell string is coupled to the last bit line BLm−1. For reference, in FIG. 2, 'DSL' denotes a drain select line, 'SSL' denotes a source select line, and 'CSL' denotes a common source line.

The memory device 150 may further include a voltage supply 310 which provides word line voltages including a program voltage, a read voltage and a pass voltage to supply to the word lines according to an operation mode. The voltage generation operation of the voltage supply 310 may be controlled by a control circuit (not illustrated). Based on the control of the control circuit, the voltage supply 310 may select one of the memory blocks (or sectors) of the memory cell array, select one of the word lines of the selected memory block, and provide the word line voltages to the selected word line and the unselected word lines.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

An operation performed by the controller 130 in response to the request or the command inputted from the host 102 may be considered a foreground operation. Referring back to FIG. 1, the controller 130 may perform a foreground operation in response to a request received from the host 102. For example, the controller 130 may control a program operation of the memory device 150 in response to a write request from the host 102, and control a read operation of the memory device 150 in response to a read request from the host 102.

The write request or read request provided from the host 102 to the controller 130 may include a logical address used in the host 102. For example, the logical address may be an LBA (Logical Block Address) used in a file system of an operating system of the host 102.

A memory region of the memory device 150 may be identified by a physical address different from the logical address. For example, different physical addresses may be allocated to the respective pages of the memory device 150. The controller 130 may generate map data by mapping a logical address and a physical address, in order to control the memory device 150. The controller 130 may store map data in the format of a map table in an internal memory thereof, based on logical addresses, the map data indicating physical addressees corresponding to the logical addresses.

The minimum unit of map data stored in the map table may be referred to as a map entry. For example, one map entry may correspond to data of one or more pages of the memory device 150. One map entry may include logical address information and physical address information which are associated with data corresponding to the map entry. When the size of a page is 4 KB, one map entry may correspond to each 4 KB or 16 KB data, depending on implementations. However, the size of data corresponding to one map entry is not limited thereto.

The memory device 150 may have a characteristic that does not support an overwrite function, while the unit of a program operation is different from the unit of an erase operation. Therefore, the controller 130 may remove existing mapping between a certain logical address and a physical address in order to change data associated with the logical address, program the data to be changed to another region of the memory device 150, generate new map data by mapping the logical address to the physical address of a region to which the changed data is programmed, and update a map table using the generated map data. For example, the controller 130 may generate a new map entry when the mapping between a logical address and a physical address is changed, and update the map table stored in the memory using the generated map entry.

The controller 130 may remove the existing mapping between a logical address and a physical address in response to a trim request of the host 102. The trim request may indicate a request that includes information on a logical address which is not used any more, and is provided by the host 102 in order to request the memory system 110 to remove mapping of the unused logical address.

Hereafter, the operation of mapping a logical address and a physical address or changing map data by removing the existing mapping between a logical address and a physical address will be referred to as an address mapping operation. Except the address mapping operation, a series of operations for accessing the memory device 150 in response to a request of the host 102 will be referred to as a data I/O operation.

The controller 130 may translate a logical address into a physical address by referring to the map table, in order to perform the data I/O operation. For example, in order to process a read request, the controller 130 may search a map entry including the logical address of the read request in the map table. The controller 130 may translate the logical address into a physical address based on the map entry. The controller 130 may control the memory device 150 to read data from a region indicated by the physical address.

The controller 130 may perform a background operation on the memory device 150 as well as the foreground operation. For example, the background operation on the memory device 150 may include a GC (Garbage Collection) operation, a wear leveling operation, a map update operation, a memory block management operation, or others. The background operation may use less resources of the memory system 110 or the controller 130 than a general operation or a foreground operation which is performed in response to a request entered from the host 102.

The controller 130 may include a processor such as a CPU (Central Processing Unit). When the CPU performs all of the data I/O operation, the address mapping operation and the background operation, it may be difficult for the controller 130 to exhibit throughput required by the specification of the memory system 110 through only one CPU. For example, when a data I/O operation is requested while one CPU performs a GC operation, the controller 130 may end the GC operation, and then perform the data I/O operation. When the data I/O operation is performed after the GC operation is ended, the data I/O operation may be delayed, and the throughput may be degraded.

When the controller 130 includes a plurality of CPUs which control the data input/output operation, the address mapping operation and the background operation in parallel, the throughput of the memory system 110 may be improved. However, as the number of CPUs in the controller 130 is increased, the chip size of the controller 130 may be increased, and the power consumption may also be increased.

In accordance with the present embodiment, the controller 130 may include one or more CPUs and a plurality of TPUs (Tensor Processing Units). The plurality of TPUs may perform the data I/O operation without intervention of the CPU. The CPU may perform a memory management operation including the address mapping operation and the background operation. FIG. 1 schematically illustrates a control plane 210 and an I/O plane 230. The control plane 210 may include the CPU (not shown) and the I/O plane 230 may including the plurality of TPUs (not shown)

The CPU and the plurality of TPUs may be operated at the same time. Therefore, the controller 130 may perform the memory management operation and the data I/O operation in parallel. When the memory management operation and the data I/O operation are performed in parallel, the data I/O operation may not be delayed by the memory management operation, and the throughput of the data I/O operation may be improved.

The CPU which is a general-purpose processor may include a plurality of logic gates, for example, seven million logic gates, in order to support various computations. On the other hand, the TPU which is a processor specialized in some computations among the various operations may include a smaller number of logic gates than the CPU, for example, 200,000 logic gates. Therefore, even when the controller 130 performs the data I/O operation using the plurality of TPUs, the chip size of the controller 130 and the power consumption can be reduced as compared to when the plurality of CPUs perform the data I/O operation, the address mapping operation and the background operation in parallel.

For the data I/O operation, firmware may be driven in each of the TPUs. When the memory system 110 is booted, plural pieces of firmware stored in the memory device 150 may be loaded to an internal memory of the controller 130, and driven in the respective TPUs. The pieces of firmware stored in the memory device 150 may be changed. When the plurality of TPUs are used to perform the data I/O operation, it is possible to make the controller 130 more easily adapt to various use environments as compared to when hardware circuits which are difficult to modify are used to perform the data I/O operation.

The plurality of TPUs may configure a pipeline to improve the throughput of the data I/O operation. The pipeline is used to generate data flow logic packages. The pipeline is configured to include a series of data processing steps such that each step delivers an output that is the input to the next step. More detailed descriptions about the controller 130 including the plurality of TPUs configuring a pipeline will be provided with reference to FIG. 3.

Figure 3:
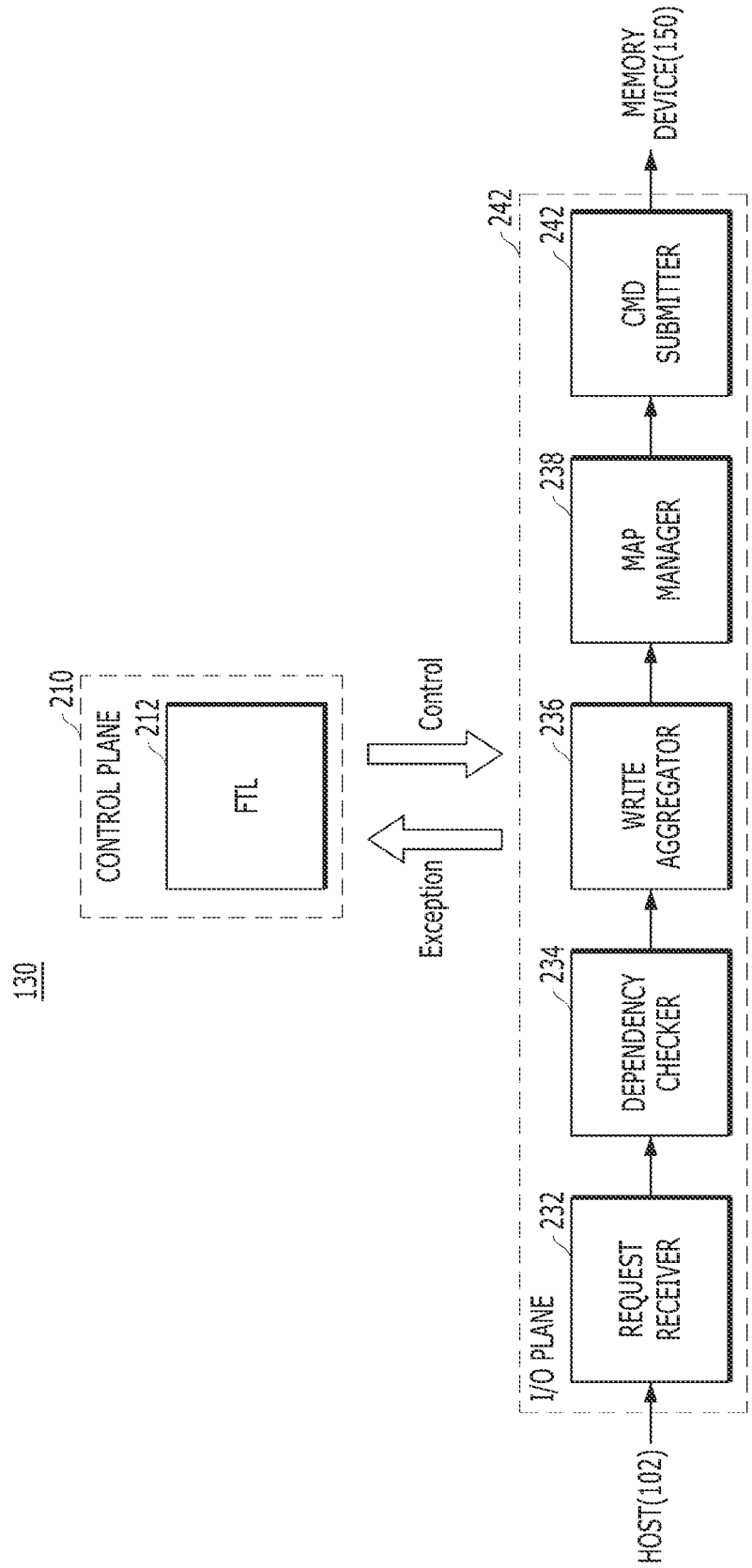
FIG. 3 is a diagram schematically illustrating a controller in accordance with an embodiment of the disclosed technology.

FIG. 3 is a diagram schematically illustrating the controller 130 in accordance with the present embodiment. Specifically, FIG. 3 is a block diagram illustrating blocks of the controller 130 that are classified based on functions.

As described with reference to FIG. 1, the controller 130 may include the control plane 210 and the I/O plane 230. The control plane 210 may perform the memory management operation described with reference to FIG. 1, and perform exception handling in the data I/O operation. The control plane 210 may be implemented as firmware which is referred to as an FTL (Flash Translation Layer) 212.

The I/O plane 230 may include a request receiver 232, a dependency checker 234, a write aggregator 236, a map manager 238 and an command submitter 242 as logical blocks. Each of the logical blocks included in the I/O plane 230 may be implemented as one or more pieces of firmware. The logical blocks may configure a pipeline for the data I/O operation. Except an exceptional case, the I/O plane 230 may perform a data I/O operation corresponding to a certain request and process the request without any intervention of the control plane 210. For example, the exceptional case may include the case in which the address mapping operation is required to process the request or the case in which the request has dependency on a request received prior to the request. The case in which the request has dependency will be described below in detail.

The I/O plane 230 may provide an exception signal to the control plane 210, when an exceptional case of the data I/O operation occurs. The control plane 210 may perform the data I/O operation in response to the exception signal.

The control plane 210 may perform the memory management operation. The control plane 210 may perform the data I/O operation in order to perform the memory management operation. For example, the control plane 210 needs to control read and program operations of the memory device 150 in order to perform a GC operation. The control plane 210 may provide a control signal to the I/O plane 230, and control the I/O plane 230 to perform a data I/O operation required for performing the memory management operation.

Hereafter, the functions of the respective logical blocks included in the I/O plane 230 will be described.

The request receiver 232 may receive a request from the host 102. The request receiver 232 may parse the received request, and determine the type of the received request. For example, the type of the request may be determined as any one of a read request, a write request and a trim request.

The request receiver 232 may slice the request into a plurality of requests according to the size of data associated with the request.

The request receiver 232 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) or integrated drive electronics (IDE).

The dependency checker 234 may determine or check a dependency of the request received from the request receiver 232 on an uncompleted request which was received prior to the currently received request. The dependency checker 234 may determine that the received request has the dependency in case that the uncompleted request affects the processing order of the received request.

In some implementations, the dependency checker 234 may check the dependency of the request on the uncompleted trim request, the uncompleted write request, or others. The trim request is configured to optimize garbage collection and erase operations in memory devices that erase blocks of storage elements prior to writing new data to the storage elements. For example, when a previously received trim request is not completely processed, the mapping between a logical address and a physical address, which are associated with the uncompleted trim request, may not yet be removed. Furthermore, when a previously received write request is not completely processed, data associated with the uncompleted write request may not yet be programmed to the memory device 150. When the logical address of the received request is same as the logical address of an uncompleted trim request or uncompleted write request, data on the logical address may not be normally stored in the memory device 150 if the uncompleted trim request or the uncompleted write request is not processed before the received request. When the logical address of the received request is same as the logical address of the uncompleted trim request or the uncompleted write request, the dependency checker 234 may determine that the received request has dependency.

The dependency checker 234 may cache a logical address associated with a write request until the memory device 150 completes a program operation in response to the write request, and display a logical address associated with a trim request as a bitmap until the mapping between a physical address and the logical address associated with the trim request is removed in response to the trim request. When a logical address associated with the request received from the request receiver 232 corresponds to the cached logical address and the logical address displayed as the bitmap, the dependency checker 234 may determine that the logical address has dependency.

The write aggregator 236 may queue write requests received from the dependency checker 234 into a write queue, and aggregate the queued write requests. The operation of aggregating the write requests may include an operation of striping data associated with the queued write requests. The striping of data includes segments of logically sequential data that are distributed across a plurality of storage devices (e.g., memory dies).

The plurality of memory dies DIE1 and DIE2 illustrated in FIG. 1 may perform program or read operations in parallel. Each of the memory dies may perform an one-shot program operation in which a plurality of logic pages associated with one word line is programmed through one program cycle based on a memory cell level of a memory block. The one-shot program operation refers to a program operation in which data that can be stored in multiple logic pages is stored through one program cycle.

The striping operation may include an operation of deciding the way addresses of a plurality of data chunks such that the plurality of data chunks can be distributed and programmed to a plurality of memory dies. The striping operation may further include an operation of deciding the logical page addresses of a plurality of data chunks, such that the plurality of data chunks can be one-shot programmed. When the sum of the sizes of data associated with the queued write requests reaches a predetermined size, the write aggregator 236 may stripe the data. The predetermined size may be determined based on the page size, the number of memory dies included in one channel, and the memory cell level. Hereafter, the predetermined size is referred to as a striping size.

When the data is striped, the plurality of memory dies DIE1 to DIE2 may program the data at the same time, and read the data at the same time. Thus, the throughput of the memory system 110 can be improved. The write aggregator 236 may provide an exception signal to the FTL 212 to map the logical addresses for the aggregated write requests.

In response to the request, the map manager 238 may translate a logical address of a region for the request is to be performed into a physical address, and generate a command to be provided to the memory device 150 based on the physical address. The map manager 238 may update map data in the memory 144, which has been changed by the address mapping operation of the FTL 212. The map manager 238 may store, in the memory device 150, at least a part of a map table which is stored in the memory 144 in response to a map flush request of the FTL 212.

The command submitter 242 may control the memory device 150 using the generated command.

The command submitter 242 may serve as a memory/storage interface for interfacing the controller 130 and the memory device 150 such that the controller 130 controls the memory device 150 in response to a request from the host 102. When the memory device 150 is a flash memory or specifically a NAND flash memory, the command submitter 242 may generate a control signal for the memory device 150 and process data to be provided to the memory device 150 based on the control of the CPU 134. The command submitter 242 may work as an interface (e.g., a NAND flash interface) for processing a command and data between the controller 130 and the memory device 150. In some implementations, the command submitter 242 may support data transfer between the controller 130 and the memory device 150.

Figure 4:
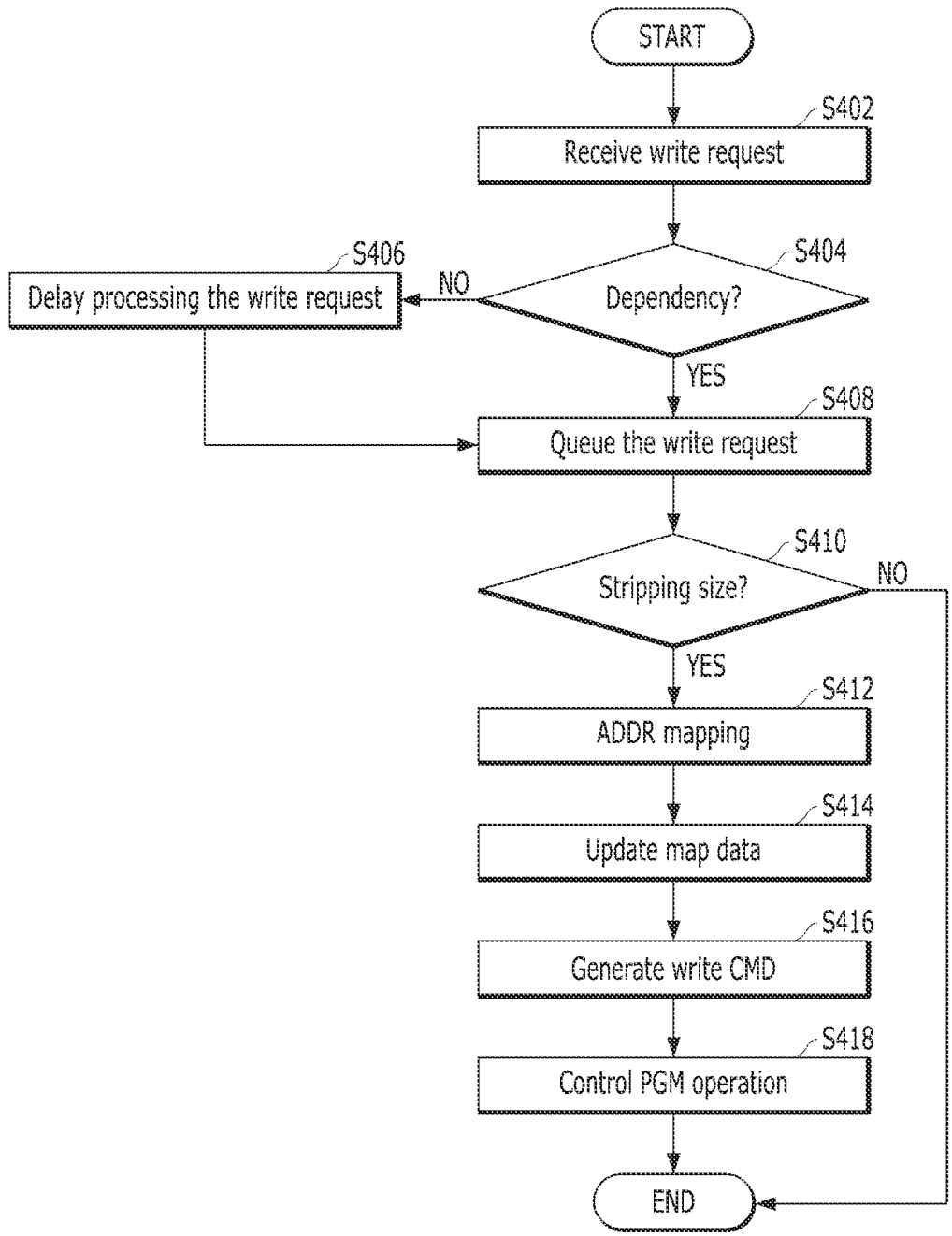
FIG. 4 is a flowchart for describing a write operation of the controller in accordance with an embodiment of the disclosed technology.

FIG. 4 is a flowchart for describing a write operation of the controller 130 in accordance with an embodiment of the disclosed technology.

In step S402, the request receiver 232 may receive a request from the host 102, which corresponds to a write request. As will be explained later in this document, the request receiver 232 includes a host TPU group which determines the type of the request from the host 102. Thus, the request receiver 232 identifies the request from the host 102 as a write request or a read request.

Write data corresponding to the write request may be buffered into an internal buffer of the controller 130 through a host DMA (Direct Memory Access) (not illustrated) without intervention of the control plane 210 and the I/O plane 230. When the write data is completely buffered into the buffer, the request receiver 232 may provide a response to the host 102.

In step S404, the dependency checker 234 may determine whether the request received from the request receiver 232 has dependency on a request which has been received prior to the received request but not been completely processed.

When the received request has no dependency ("NO" in step S404), the dependency checker 234 may provide the received request to the write aggregator 236. In step S408, the write aggregator 236 may queue the received request into a write queue.

When the received request has dependency ("YES" in step S404), the dependency checker 234 may provide an exception signal to the FTL 212. In step S406, the FTL 212 may delay processing the received request until the uncompleted request is completely processed. When the uncompleted request is completely processed, the FTL 212 may provide a control signal to the write aggregator 236. The write aggregator 236 may perform step S408 in response to the control signal.

In step S410, the write aggregator 236 may determine whether the request queuing result indicates that the sum of the sizes of the data associated with write requests queued in the write queue reached a predetermined striping size.

When the sum of the sizes of the data does not reach the predetermined striping size ("NO" in step S410), the write aggregator 236 may end the write operation while the write data is being buffered in the buffer.

When the sum of the sizes of the data reaches the predetermined striping size ("YES" in step S410), the write aggregator 236 may provide the exception signal to the FTL 212. In step S412, the FTL 212 may perform an address mapping operation on the write requests queued in the write queue in response to the exception signal, thereby mapping the logical addresses of the write requests to physical addresses. The FTL 212 may provide a control signal to the map manager 238 when the address mapping operation is completely performed.

In step S414, the map manager 238 may update the map data, which has been changed by the address mapping operation, into the memory 144.

In step S416, the map manager 238 may generate a write command for controlling the memory device 150 based on the physical addresses of the write requests.

In step S418, the command submitter 242 may control a program operation of the memory device 150 based on the write command from the map manager 238.

Figure 5:
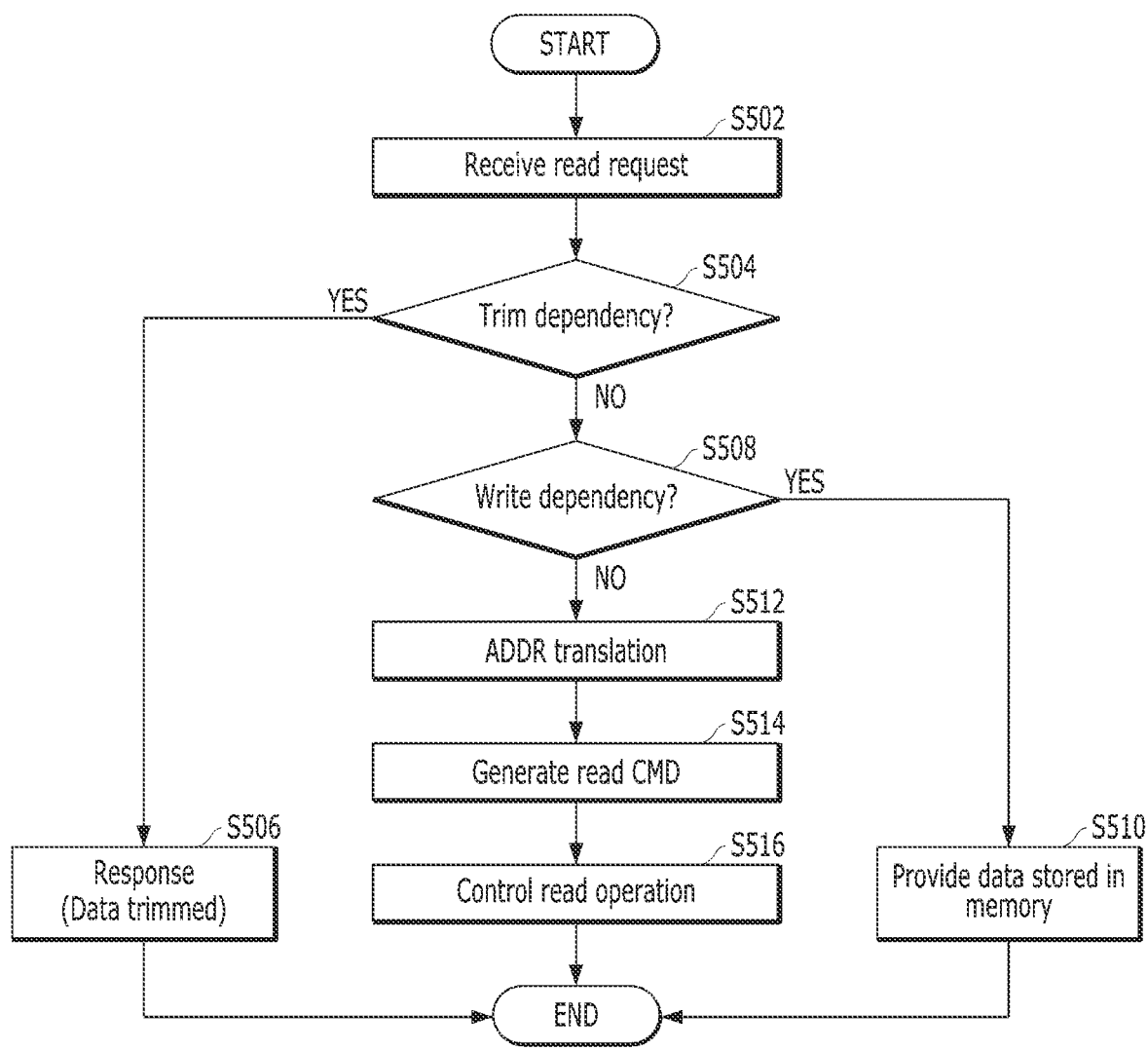
FIG. 5 is a flowchart for describing a read operation of the controller in accordance with an embodiment of the disclosed technology.

FIG. 5 is a flowchart for describing a read operation of the controller 130 in accordance with an embodiment of the disclosed technology.

In step S502, the request receiver 232 may receive a request from the host 102, which corresponds to a read request.

In step S504, the dependency checker 234 may determine whether the read request received from the request receiver 232 has dependency on an uncompleted trim request.

When the read request has dependency on the uncompleted trim request ("YES" in step S504), the mapping between a physical address and a logical address associated with the trim request may not yet be removed. However, since the host 102 has already provided the trim request, the host 102 may request the memory system 110 to reflect the trim request. In step S506, the dependency checker 234 may provide an exception signal to the FTL 212. The FTL 212 may provide a response to the host 102 through the request receiver 232 in response to the exception signal, the response indicating that a logical address associated with the read request has been already trimmed.

When the read request has no dependency on the uncompleted trim request ("NO" in step S504), the dependency checker 234 may determine whether the read request has dependency on the uncompleted write request in step S508.

When the read request has dependency on the uncompleted write request ("YES" in step S508), data associated with the write request may not yet be programmed to the memory device 150 and data may be buffered in the buffer. Since the host 102 has already provided the write request, the host 102 may provide the memory system 110 with a read request having the same address as the write request in order to request the memory system 110 to provide the data. In step S510, the dependency checker 234 may provide an exception signal to the FTL 212. The FTL 212 may provide the host 102 with the data buffered in the buffer, in response to the exception signal.

When the read request has no dependency on the uncompleted write request ("NO" in step S508), the dependency checker 234 may provide the read request to the map manager 238. In step S512, the map manager 238 may translate the logical address of the read request into a physical address by referring to the map data stored in the controller 130.

In step S514, the map manager 238 may generate a read command for controlling the memory device 150 based on the physical address.

In step S516, the command submitter 242 may control a read operation of the memory device 150 based on the read command from the map manager 238.

Figure 6:
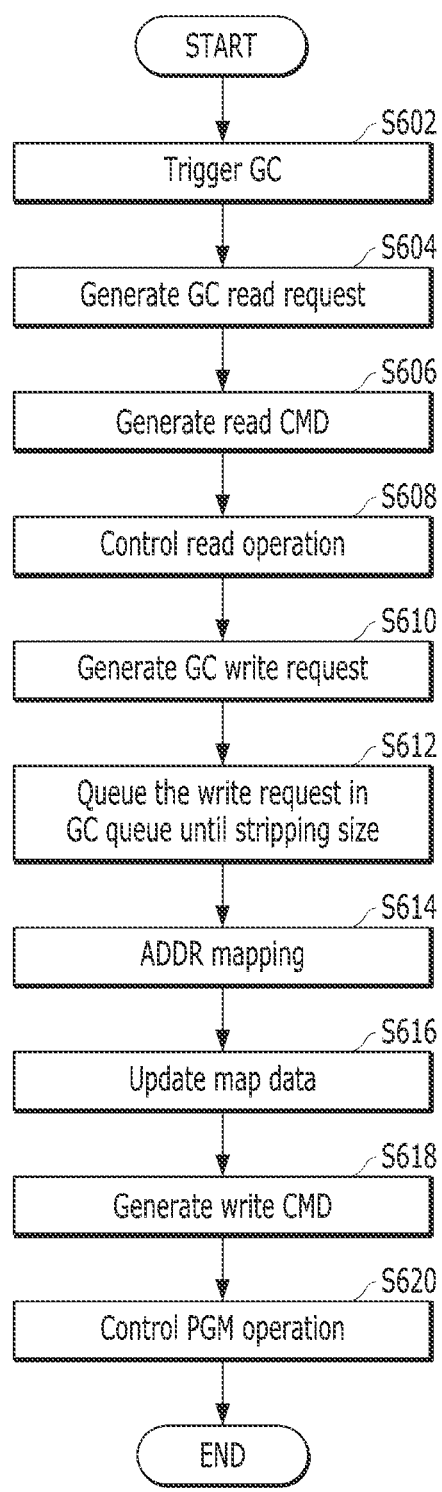
FIG. 6 is a flowchart for describing a background operation of the controller in accordance with an embodiment of the disclosed technology.

FIG. 6 is a flowchart for describing a background operation of the controller 130 in accordance with an embodiment of the disclosed technology.

FIG. 6 illustrates a GC operation of the controller 130. The controller 130 may perform the GC operation of collecting valid data of source blocks and storing the collected data in a destination block, thereby securing an available space of the memory device 150.

In step S602, the FTL 212 may trigger the GC operation. The FTL 212 may select a source block and a destination block among the memory blocks of the memory device 150, in order to perform the GC operation.

In step S604, the FTL 212 may generate a GC read request in order to collect valid data of the source block. The FTL 212 may provide a control signal to the map manager 238 to perform the GC read request.

In step S606, the map manager 238 may determine the logical address and physical address of valid data to be read in response to the GC read request, by referring to the map data stored in the controller 130. The map manager 238 may generate a read command based on the physical address of the valid data.

In step S608, the command submitter 242 may control a read operation of the memory device 150 based on the read command. The data read from the memory device 150 may be buffered into an internal buffer of the controller 130.

In step S610, the FTL 212 may generate a GC write request for the buffered data. The FTL 212 may provide a control signal to the write aggregator 236 to perform the GC write request.

In step S612, the write aggregator 236 may queue the GC write request into a write queue. In an implementation, a host write request (write request received from the host) and the GC write request may be queued into different write queues. The write aggregator 236 may queue GC write requests into the write queue until the sum of the sizes of data associated with the GC write requests queued in the write queue reaches the striping size. The write aggregator 236 may provide an exception signal to the FTL 212 when the sum of the sizes of the data reaches the striping size.

In step S614, the FTL 212 may perform an address mapping operation between the logical addresses and the physical addresses of the GC write requests, such that the data can be stored in the destination block. The FTL 212 may provide a control signal to the map manager 238 when the address mapping operation is completely performed.

In step S616, the map manager 238 may update the map data, changed by the address mapping operation, into the memory 144.

In step S618, the map manager 238 may generate a write command for controlling the memory device 150 based on the physical addresses of the write requests.

In step S620, the command submitter 242 may control a program operation of the memory device 150 based on the write command from the map manager 238, thereby storing the valid data of the source block in the destination block.

An example in which the logical blocks described with reference to FIG. 3 are implemented in the controller 130 will be described in detail with reference to FIG. 7.

Figure 7:
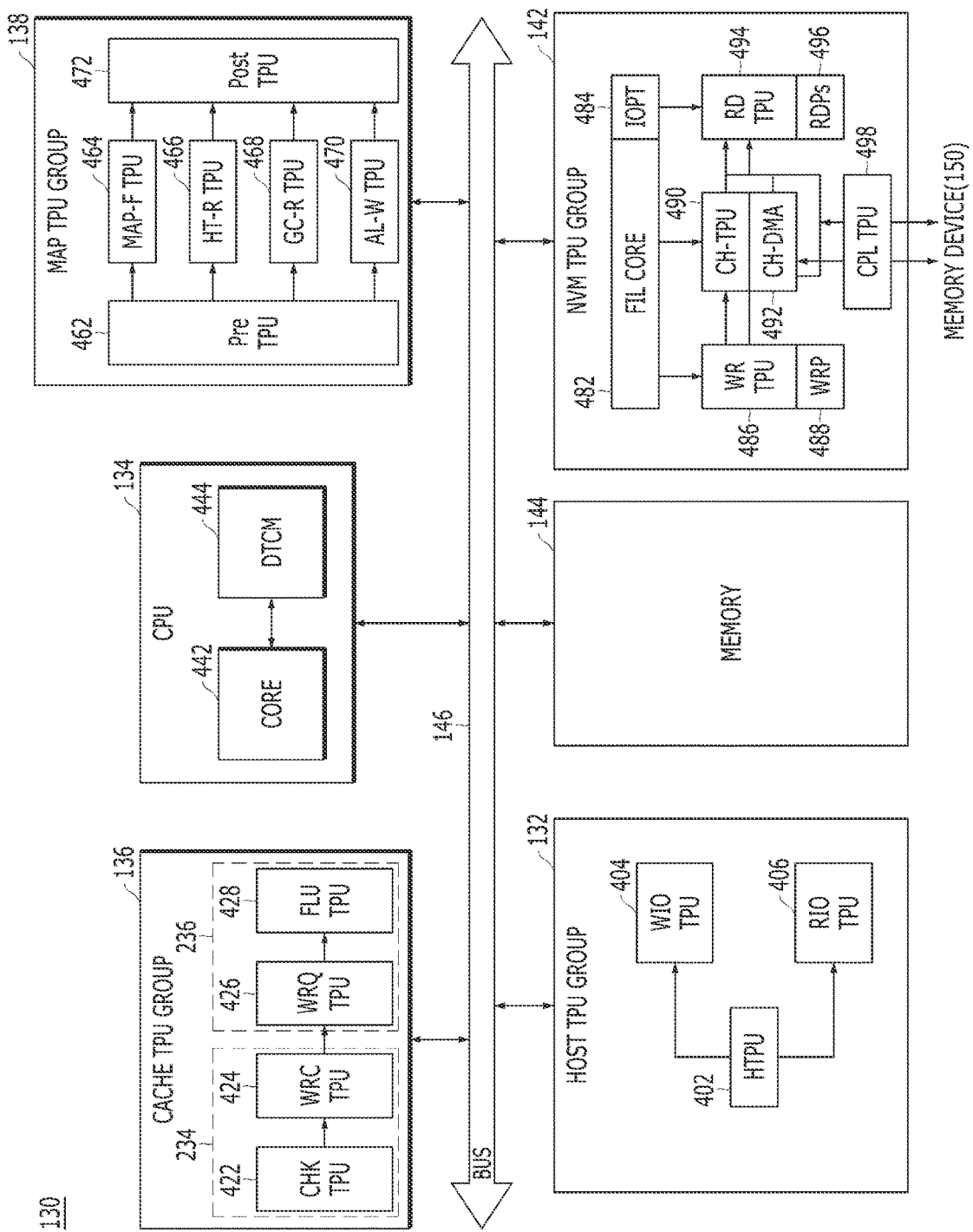
FIG. 7 is a diagram illustrating the controller in accordance with an embodiment of the disclosed technology.

FIG. 7 is a diagram illustrating the controller 130 in accordance with the present embodiment in detail.

The controller 130 may include a CPU 134, a plurality of TPUs and the memory 144. The plurality of TPUs may be grouped by function. Referring to FIG. 3, the plurality of TPUs may include a host TPU group 132, a cache TPU group 136, a map TPU group 138 and an NVM TPU group 142. In an implementation, one TPU group may share an LLC (Last Level Cache) (not illustrated).

The CPU 134, the plurality of TPUs and the memory 144 may be coupled to one another through a bus 146.

The memory 144 may serve as a working memory of the memory system 110 and the controller 130, and store data for driving the memory system 110 and the controller 130. For example, the memory 144 may temporarily store data inputted/outputted between the host 102 and the memory device 150. The memory 144 may store map data for an address translation operation. The memory 144 may store metadata for a memory management operation, such as read count information, valid page information and journal data.

The memory 144 may be implemented as a volatile memory. For example, the memory 144 may be implemented as an SRAM (Static Random Access Memory) or DRAM (Dynamic Random Access Memory). The memory 144 may be disposed inside or outside the controller 130. FIG. 1 illustrates the memory 144 disposed in the controller 130. In an embodiment, the memory 144 may be implemented as an external volatile memory device which has a memory interface for inputting/outputting data between the memory 144 and the controller 130.

The host TPU group 132 may drive the request receiver 232 described with reference to FIG. 3. The host TPU group 132 may include a host TPU 402, a write I/O TPU 404 and a read I/O TPU 406.

The host TPU 402 may parse a request received from the host 102, and determine the type of the request. The host TPU 402 may provide the request to the write I/O TPU 404 when the request is a write request, and provide the request to the read I/O TPU 406 when the request is a read request.

The write I/O TPU 404 may provide the cache TPU group 136 with the write request received from the host TPU 402. The write I/O TPU 404 may slice the request into a plurality of requests based on the size of data associated with the write request, and provide the plurality of sliced requests to the cache TPU group 136. For example, when receiving a write request for 128 KB data, the write I/O TPU 404 may slice the write request into 32 write requests each sliced write request for 4 KB data corresponding to the minimum unit of address mapping. The minimum unit of address mapping is not limited thereto. In an implementation, the write I/O TPU 404 and the cache TPU group 136 may be coupled to each other through an interface separate from the bus 146.

The read I/O TPU 406 may provide the cache TPU group 136 with the read request received from the host TPU 402. Like the write I/O TPU 404, the read I/O TPU 406 may slice the request into a plurality of requests based on the size of data associated with the read request, and provide the plurality of sliced requests to the cache TPU group 136. In an implementation, the read I/O TPU 406 and the cache TPU group 136 may be coupled to each other through an interface separate from the bus 146.

The cache TPU group 136 may drive the dependency checker 234 and the write aggregator 236, which have been described with reference to FIG. 3. The cache TPU group 136 may include a check TPU 422, a write cache TPU 424, a write queue TPU 426 and a flush TPU 428.

The dependency checker 234 may be driven by the check TPU 422 and the write cache TPU 424.

The check TPU 422 may determine whether the request received from the write I/O TPU 404 or the read I/O TPU 406 has dependency on an uncompleted trim request.

Map table may not reflect information indicating that the mapping of the logical address of the trim request has been removed until the trim request is completely processed. When the controller 130 processes a read request or write request for the same logical address as the logical address of the trim request before the trim request is completely processed, wrong data may be provided to the host 102, or data from the host 102 may not be normally stored in the memory device 150. Therefore, the check TPU 422 may determine whether the logical address of the request received from the write I/O TPU 404 or the read I/O TPU 406 is same as the logical address of the uncompleted trim request.

For example, when a trim request is received from the write I/O TPU 404, the check TPU 422 may display the logical address of the trim request on a trim bitmap. The check TPU 422 may periodically provide an exception signal to the CPU 134 to remove the mapping of logical addresses displayed on the trim bitmap. The check TPU 422 may remove the display of the trim bitmap when the trim request is completely processed by the CPU 134.

The check TPU 422 may determine whether the logical address of the received request is same as the logical address of the uncompleted trim request, by referring to the trim bitmap. When the logical address of the received request is same as the logical address of the uncompleted trim request, the check TPU 422 may provide the CPU 134 with an exception signal for the received request, such that the received request can be processed after the trim request is completely processed. When the logical address of the received request is not same as the logical address of the uncompleted trim request, the check TPU 422 may provide the received request to the write cache TPU 424.

The write cache TPU 424 may determine whether the request received from the check TPU 422 has dependency on the uncompleted write request.

When the controller 130 processes a subsequent request for a certain logical address before a write request for the certain logical address is completely processed, wrong data may be provided to the host 102, or stored in the memory device 150.

The write cache TPU 424 may store logical address information on the uncompleted write request in a write cache. For example, the write cache may be included in the LLC of the cache TPU group 136. When the logical address of the received request is same as the logical address of the uncompleted write request, the write cache TPU 424 may provide the CPU 134 with an exception signal for the received request, such that the received request can be processed after the uncompleted write request is completely processed.

When the received request is a read request and the logical address thereof is not same as the logical address of the uncompleted write request, the write cache TPU 424 may provide the received request to the map TPU group 138. In an implementation, the write cache TPU 424 and the map TPU group 138 may be coupled to each other through an interface separate from the bus 146.

When the received request is a write request and the logical address thereof is not same as the logical address of the uncompleted write request, the write cache TPU 424 may provide the received request to the write queue TPU 426.

The write aggregator 236 may be driven by the write queue TPU 426 and the flush TPU 428.

The write queue TPU 426 may queue write requests into a write queue. For example, the write queue may be included in the LLC of the cache TPU group 136. When a predetermined number of write requests are queued, the write queue TPU 426 may provide the write requests to the flush TPU 428. For example, the predetermined number of write requests may indicate the number of write requests, at which the sum of the data sizes of the write requests reaches the striping size.

The flush TPU 428 may aggregate the write requests to stripe data associated with the write requests from the write queue TPU 426. For example, the flush TPU 428 may stripe the data in an order which is determined based on the number of the memory devices 150 and the memory cell levels and performance requirements of the memory devices 150. The flush TPU 428 may aggregate the write requests to program the data to the memory device 150 in the order in which the data are striped. The flush TPU 428 may provide an exception signal to the CPU 134 to map the logical addresses for the aggregated write requests.

The CPU 134 may include a core 442 and a DTCM (Data Tightly-Coupled Memory) 444. The core 442 may perform a memory management operation by driving the FTL 212 described with reference to FIG. 3. The DTCM 444 may store data whose access times in the core 442 need to be constantly guaranteed.

The core 442 may change the map data by mapping the logical addresses for the aggregated write requests in response to the exception signal from the flush TPU 428. The core 442 may change the map data by removing the address mapping of the logical addresses for the trim request in response to the exception signal from the check TPU 422.

The core 442 may control the map TPU group 138 to update the map table, stored in the memory 144, based on the changed map data. The core 442 may generate a map flush request such that the updated map table can be periodically programmed to the memory device 150, and determine a physical address of a memory region to which the updated map table is to be programmed.

The core 442 may schedule requests having dependency in response to the exception signals from the check TPU 422 and the write cache TPU 424. The core 442 may also perform the background operation described with reference to FIG. 1.

The core 442 may store a request in the DTCM 444, and provide a control signal to the map TPU group 138. The request stored in the DTCM 444 may include a write request whose address has been completely mapped, a map data update request, the request having dependency or a data I/O request included in the background operation. If necessary, the core 442 may store the changed map data in the DTCM 444 with the request.

The map TPU group 138 may drive the map manager 238 described with reference to FIG. 3. The map TPU group 138 may include a pre TPU 462, a map flush TPU 464, a host read TPU 466, a GC read TPU 468, an all-write TPU 470 and a post TPU 472.

The pre TPU 462 may fetch the request and the changed map data, which are stored in the DTCM 444. The pre TPU 462 may provide the fetched request to any one of the map flush TPU 464, the host read TPU 466, the GC read TPU 468 and the all-write TPU 470 based on the type of the fetched request.

The map flush TPU 464 may update a physical address of a memory region, to which the map table is to be programmed, into the map table of the memory 144 in response to a map flush request from the CPU 134. The physical address may be acquired from the CPU 134. The map flush TPU 464 may further update a valid page table, journal data, and/or others into the memory 144.

The host read TPU 466 may perform an address translation operation for a host read request from the host 102. The host read TPU 466 may search a physical address corresponding to the logical address of the read request by referring to the map table stored in the memory 144. The host read TPU 466 may update the read count information stored in the memory 144.

The GC read TPU 468 may perform an address translation operation for a GC read request included in a GC operation. The GC read TPU 468 may search a physical address corresponding to the logical address of the read request by referring to the map table stored in the memory 144. The GC read TPU 468 may update the read count information stored in the memory 144.

The all-write TPU 470 may update the map table of the memory 144 based on the changed map data, in response to a write request. The write request may include a write request from the host 102 and a write request included in the background operation. The all-write TPU 470 may further update a valid page table, journal data and/or others into the memory 144.

The post TPU 472 may generate a command corresponding to the request based on the physical address translated or updated by the map flush TPU 464, the host read TPU 466, the GC read TPU 468 or the all-write TPU 470, and provide the generated command to the NVM TPU group 142. The command may include a descriptor including the type of the command, a physical address associated with the command, and a word line voltage level of the memory device 150. The type of the command may include a read command and a write command. The read command may be generated based on the GC read request or the host read request. The write command may be generated based on the write request or the map flush request. The command may be referred to as IOP.

The NVM TPU group 142 may include an FIL (Flash Interface Layer) core 482, an IOPT 484, a write path TPU 486, a write path 488, a channel TPU 490, a channel DMA 492, a read path TPU 494, a read path 496 and a completion TPU 498. The NVM TPU group 142 may include the NVM CMD submitter 242 described with reference to FIG. 3.

The FIL core 482 may control the write path TPU 486, the channel TPU 490 and the read path TPU 494 by referring to the descriptor of the command from the post TPU 472. In an implementation, the FIL core 482 may be implemented as a general-purpose processor core.

The IOPT (IOP TCM) 484 may be a TCM (Tightly-Coupled Memory) of the FIL core 482. The command received from the post TPU 472 may be stored in the IOPT 484. The FIL core 482 may acquire the command from the IOPT 484.

The channel DMA 492 may provide the command to the memory device 150, and perform a data I/O operation between the memory 144 and the memory device 150. The channel TPU 490 may control the channel DMA 492 based on control of the FIL core 482. Based on the number of channels coupled to the memory device 150, a plurality of channel TPUs 490 and a plurality of channel DMAs 492 may be included in the NVM TPU group 142.

The write path 488 is a path through which data outputted from the memory 144 passes until being stored in the memory device 150 through the channel DMA 492. The write path 488 may add a parity bit to the data by performing ECC (Error Correction Code) encoding on the data passed through the write path 488. The write path TPU 486 may control the write path 488 under control of the FIL core 482.

The read path 496 is a path through which data outputted from the memory device 150 passes until being stored in the memory 144 through the channel DMA 492. The read path 496 may perform ECC decoding on the data passed through the read path 496. The read path TPU 494 may control the read path 496 based on control of the FIL core 482. Based on the number of channels coupled to the memory device 150, a plurality of read path TPUs 494 and a plurality of read paths 496 may be included in the NVM TPU group 142.

The TPUs described with reference to FIG. 7 may be operated at the same time, and configure a pipeline for the data I/O operation. The pipeline may perform the data I/O operation without intervention of the CPU 134, except an exceptional situation. Therefore, the throughput of the memory system 110 can be improved.

Hereafter, a write operation of the controller 130 in accordance with an embodiment will be described with reference to FIGS. 8 to 10.

Figure 8:
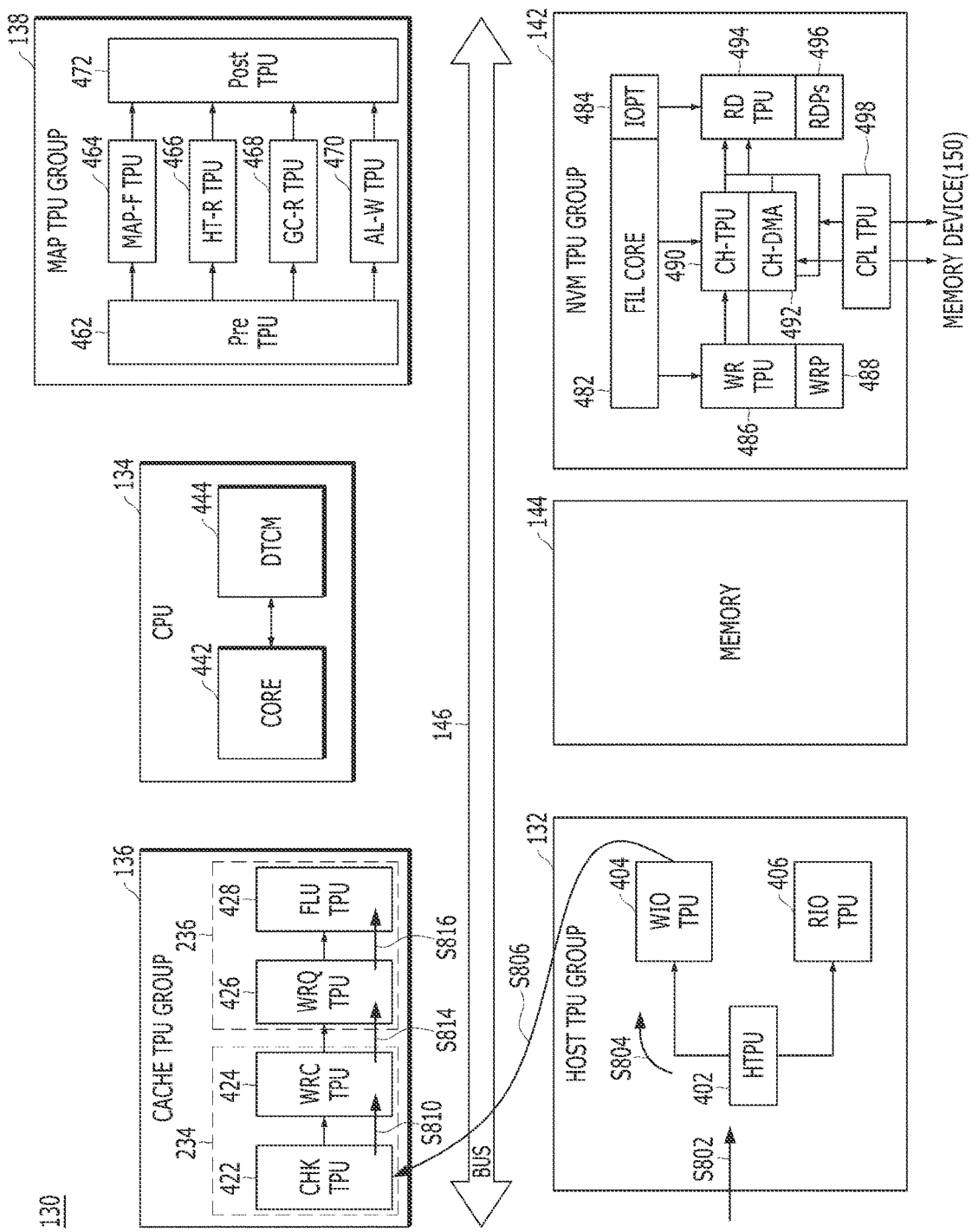
FIGS. 8 to 10 are diagrams for describing an example of an operation of a controller according to a write request of a host.

FIG. 8 is a diagram for describing a write operation of the controller 130 when the size of data in a write queue does not reach the striping size. The operation of FIG. 8 may correspond to steps S402, S404, S408 and S410 which have been described with reference to FIG. 4.

In step S802, the host TPU 402 may receive a request from the host 102. The host TPU 402 may parse the request, and provide the request to the write I/O TPU 404 when the request is determined to be a write request.

In step S804, the write I/O TPU 404 may slice the request into a plurality of write requests based on the size of write data associated with the write request, and provide the plurality of sliced write requests to the check TPU 422.

In step S806, the check TPU 422 may determine whether the write request received from the write I/O TPU 404 has dependency on an uncompleted trim request.

FIG. 8 illustrates the case in which the received write request has dependency on the uncompleted trim request. In step S810, the check TPU 422 may provide the received write request to the write cache TPU 424. The write cache TPU 424 may determine whether the write request received from the check TPU 422 has dependency on an uncompleted write request.

FIG. 8 illustrates the case in which the received write request has no dependency on the uncompleted write request. In step S814, the write cache TPU 424 may provide the received write request to the write queue TPU 426. The write queue TPU 426 may queue the received write request into a write queue.

Write data corresponding to the write request may be stored in the memory 144 through a host DMA (not illustrated) without intervention of the CPU 134 and the plurality of TPUs. Once the write data is stored in the memory 144, even before the write data is not yet programmed to the memory device 150, the host TPU group 132 may provide the host 102 with a completion response to the write request.

In step S816, the flush TPU 428 may aggregate the write requests by striping data chunks corresponding to the write requests queued in the write queue. For example, the flush TPU 428 may determine the way addresses and logical page addresses of the data chunks corresponding to the respective write requests, such that the data chunks can be distributed and programmed to a plurality of memory dies, and one-shot programmed to a plurality of logical pages.

The flush TPU 428 may stripe the data chunks in response to the write requests until the sum of the sizes of data corresponding to the queued write requests reaches the striping size or a flush request is received from the host 102, and then end the write operation.

Figure 9:
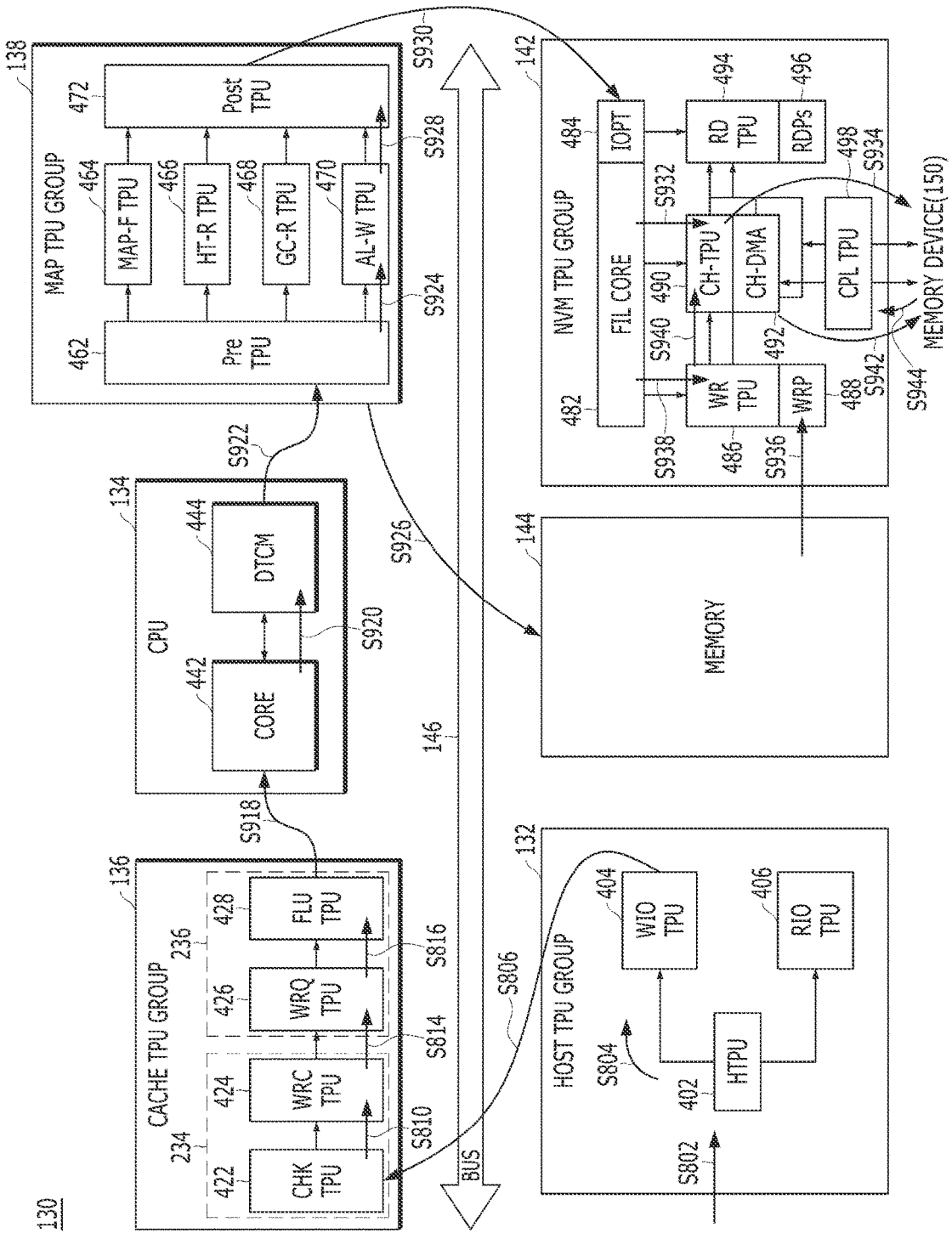

FIG. 9 is a diagram for describing a write operation of the controller 130 when the sum of the sizes of data in a write queue reaches the striping size. The operation of FIG. 9 may correspond to steps S402, S404 and S408 to S418 which have been described with reference to FIG. 4.

Steps S802 to S816 illustrated in FIG. 9 may be the same as steps S802 to S816 described with reference to FIG. 8.

In step S918, when the sum of the sizes of data corresponding to the queued write requests reaches the striping size or the flush request is received from the host 102, the flush TPU 428 may provide an exception signal to the core 442 to map the logical addresses for the aggregated write requests.

In step S920, the core 442 may perform an address mapping operation of mapping the logical addresses to physical addresses, in response to the exception signal. The core 442 may store the aggregated write requests and map data, generated through the address mapping operation, in the DTCM 444.

In some implementations, the core 442 may further perform a background operation in order to perform the address mapping operation. For example, the core 442 may perform a memory block management operation including an operation of allocating an open block and an operation of detecting a bad block.

In processing a write request, the address mapping operation of the core 442 may occupy substantial amount of time. The address mapping operation of the core 442 may not need to be performed every time when receiving a write request from the host 102. For example, the address mapping operation of the core 442 may not be performed until a predetermined number of write requests are queued into the write queue. Therefore, although the core 442 intervenes in the address mapping operation, the entire throughput of the write requests can be improved.

In step S922, the pre TPU 462 may acquire the write request and map data from the DTCM 444.

In step S924, the pre TPU may parse the acquired request, and provide a write request and the map data to the all-write TPU 470, when the acquired request is determined to be the write request.

In step S926, the all-write TPU 470 may update a map table stored in the memory 144 using the map data.

In step S928, when the map table is updated, the all-write TPU 470 may provide the post TPU 472 with the write request and a physical address included in the map data.

In step S930, the post TPU 472 may generate a write command for controlling the memory device 150 based on the write request and the physical address from the all-write TPU 470. The post TPU 472 may provide the generated write command to the IOPT 484.

In step S932, the FIL core 482 may acquire the command from the IOPT 484, and determine that the acquired command is a write command. In step S934, the FIL core 482 may control the channel TPU 490 and the write path TPU 486 in response to the write command.

In steps S936 and S938, the FIL core 482 may provide the write command to the memory device 150 through the channel DMA 492. The write TPU 486 may control the write path 488 to acquire write data from the memory 144, under control of the FIL core 482.

In steps S940 and S942, the channel TPU 490 may control the channel DMA 492 to provide the memory device 150 with the write data acquired from the write path 488, under control of the FIL core 482. The memory device 150 may program the write data in response to the write command.

When the write data is completely programmed, the completion TPU 498 may receive a response from the memory device 150 in step S944. Based on the response, the completion TPU 498 may completely process the write request or provide an exception signal to the core 442.

Figure 10:
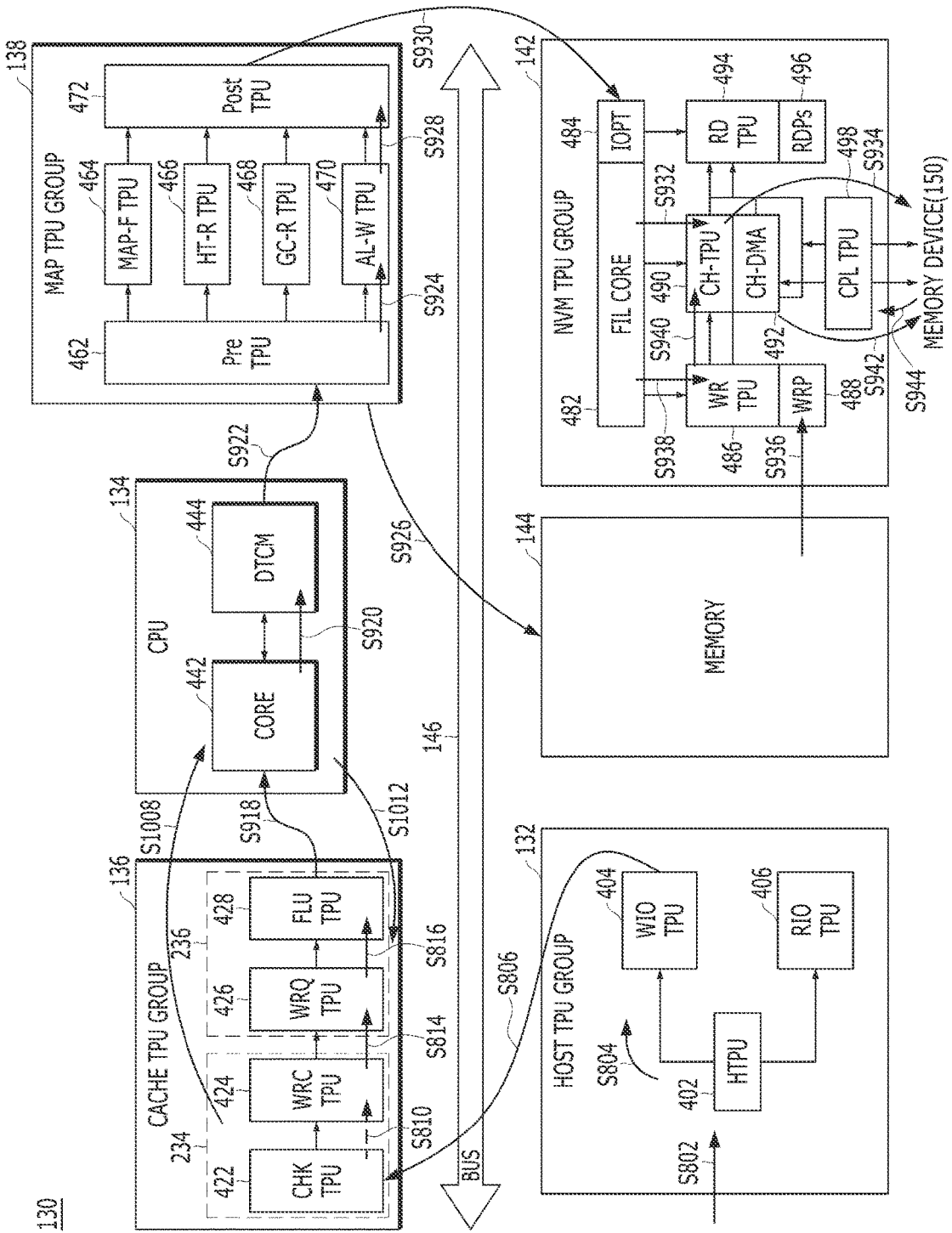

FIG. 10 is a diagram for describing a write operation of the controller 130 when a write request has dependency on an uncompleted request. The operation of FIG. 10 may correspond to steps S402 to S408 which have been described with reference to FIG. 4.

Steps S802 to S810 may be the same as steps S802 to S810 described with reference to FIG. 8.

When the determination result of steps S806 and S810 indicates that the received request has dependency on an uncompleted trim request or uncompleted write request, the dependency checker 234 may provide an exception signal to the core 442 in step S1008. The core 442 may delay processing the received request in response to the exception signal, until the uncompleted trim request or the uncompleted write request is completely processed.

When the uncompleted request is completely processed, the core 442 may provide a control signal to the write queue TPU 426 in step S1012. The write queue TPU 426 may queue the received request into a write queue in response to the control signal.

After the received request is queued, the queued request may be processed in the same manner as described with reference to step S816 of FIG. 8 and steps S918 to S944 of FIG. 9.

Hereafter, a read operation of the controller 130 in accordance with an embodiment will be described with reference to FIGS. 11 to 13.

Figure 11:
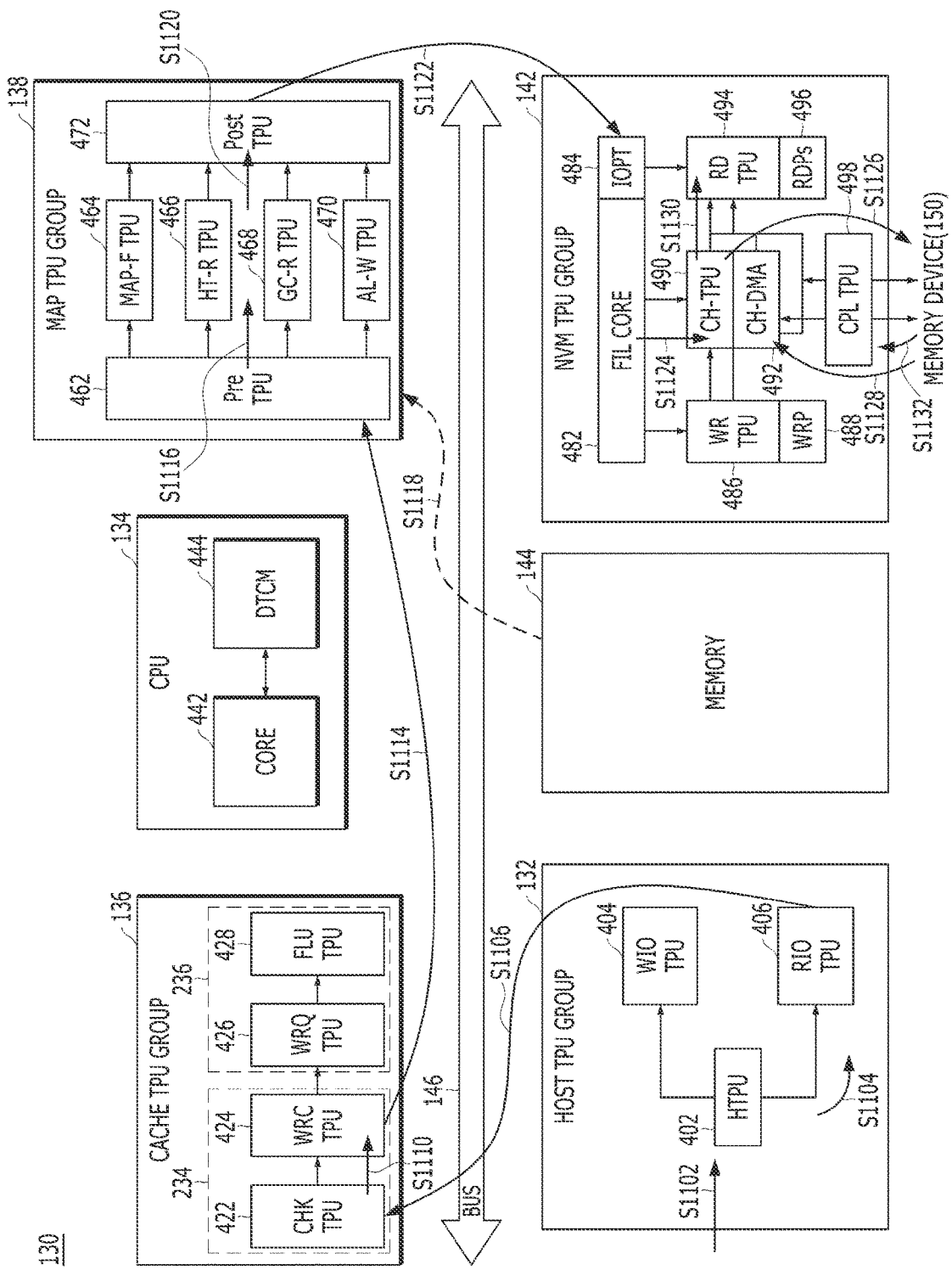
FIGS. 11 to 13 are diagrams for describing an example of an operation of a controller according to a read request of the host.

FIG. 11 is a diagram for describing an operation of the controller 130 for a read request of the host 102. For example, FIG. 11 illustrates the case in which the read request has no dependency on an uncompleted trim command or write command. The operation of FIG. 11 may correspond to steps S502, S504, S508 and S512 to S516 which have been described with reference to FIG. 5.

In step S1102, the host TPU 402 may receive a request from the host 102. The host TPU 402 may parse the request, and provide the request to the read I/O TPU 406 when the request is determined as a read request.

In step S1104, the read I/O TPU 406 may provide the read request to the check TPU 422 based on the size of read data associated with the read request.

In step S1106, the check TPU 422 may determine whether the read request received from the read I/O TPU 406 has dependency on an uncompleted trim request.

When the received read request has no dependency on the uncompleted trim request, the check TPU 422 may provide the received read request to the write cache TPU 424 in step S1110. The write cache TPU 424 may determine whether the read request received from the check TPU 422 has dependency on an uncompleted write request.

When the received read request has no dependency on the uncompleted write request, the write cache TPU 424 may provide the received read request to the pre TPU 462 in step S1114.

In step S1116, the pre TPU 462 may parse the request acquired from the write cache TPU 424, and provide the request to the host read TPU 466, when the request is determined as a read request from the host 102.

In step S1118, the host read TPU 466 may search a physical address mapped to a logical address of the read request, by referring to the map table stored in the memory 144, and translate the logical address into the searched physical address.

In step S1120, the host read TPU 466 may provide the read request and the searched physical address to the post TPU 472.

In step S1122, the post TPU 472 may generate a read command for controlling the memory device 150 based on the read request and the physical address from the host read TPU 466. The post TPU 472 may provide the generated read command to the IOPT 484.

In steps S1124 and S1126, the FIL core 482 may acquire the command from the IOPT 484, and determine that the acquired command is a read command. The channel DMA 492 may provide the read command to the memory device 150 under control of the FIL core 482. The memory device 150 may perform a read operation in response to the read command.

In steps S1128 and S1130, the channel TPU 490 may control the channel DMA 492 to provide the read path 496 with read data acquired from the memory device 150, under control of the FIL core 482. The read data may be stored in the memory 144 through the read path 496, and provided to the host 102 through a host DMA (not illustrated).

Figure 12:
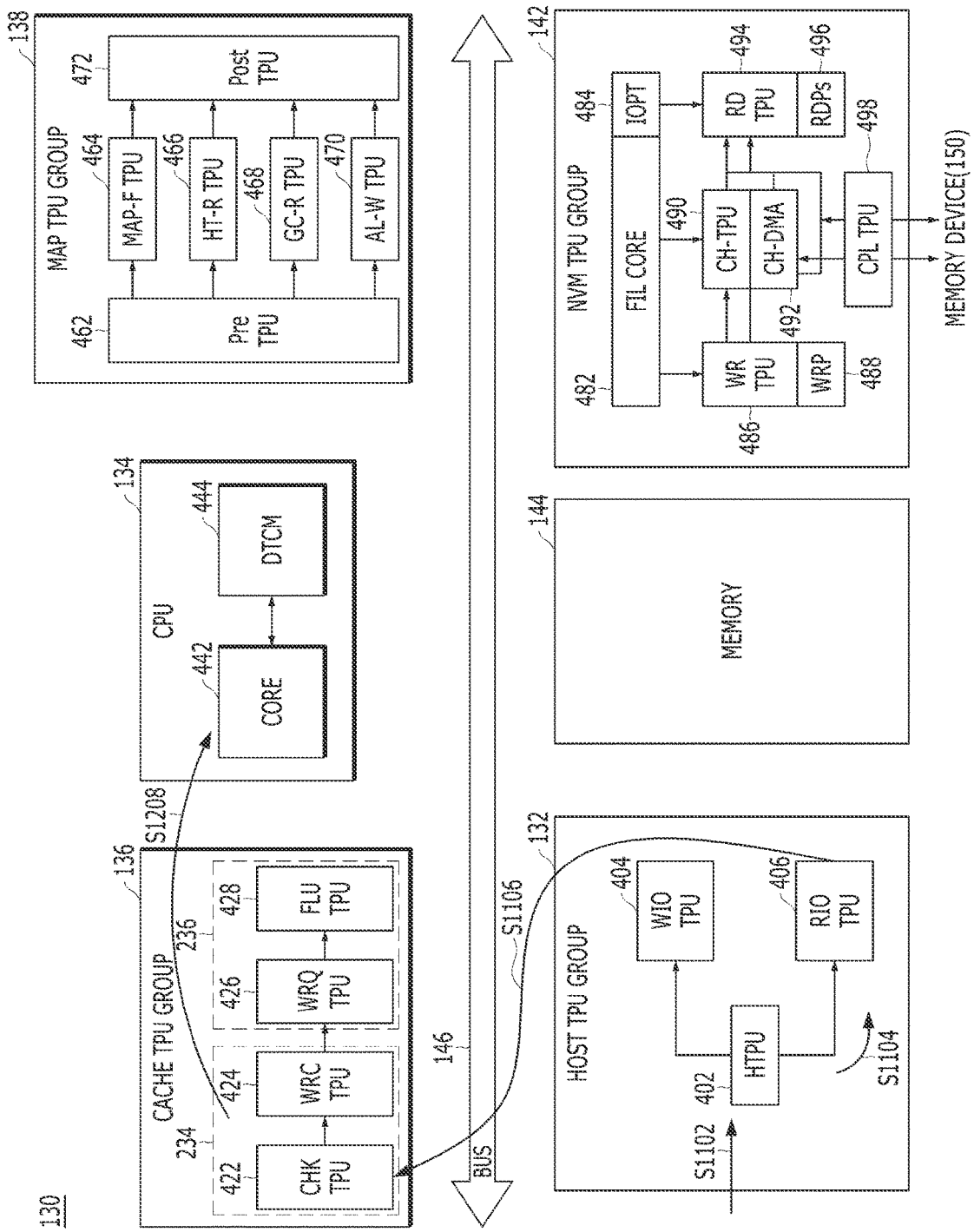

FIG. 12 illustrates an operation of the controller 130 when a read request has dependency on an uncompleted trim request. The operation of FIG. 12 may correspond to steps S502 to S506 which have been described with reference to FIG. 5.

Steps S1102 to S1106 may be the same as steps S1102 to S1106 described with reference to FIG. 11.

When the determination result of step S1106 indicates that the received read request has dependency on an uncompleted trim request, the check TPU 422 may provide the core 442 with an exception signal for the received read request in step S1208. The core 442 may provide a response to the host 102 in response to the exception signal, the response indicating that a logical address of the received read request has been trimmed.

The operation of determining the dependency of the read request on the uncompleted trim request and performing exception handling may prevent the problem that the memory system 110 provides wrong data to the host 102 in response to the read request.

Figure 13:
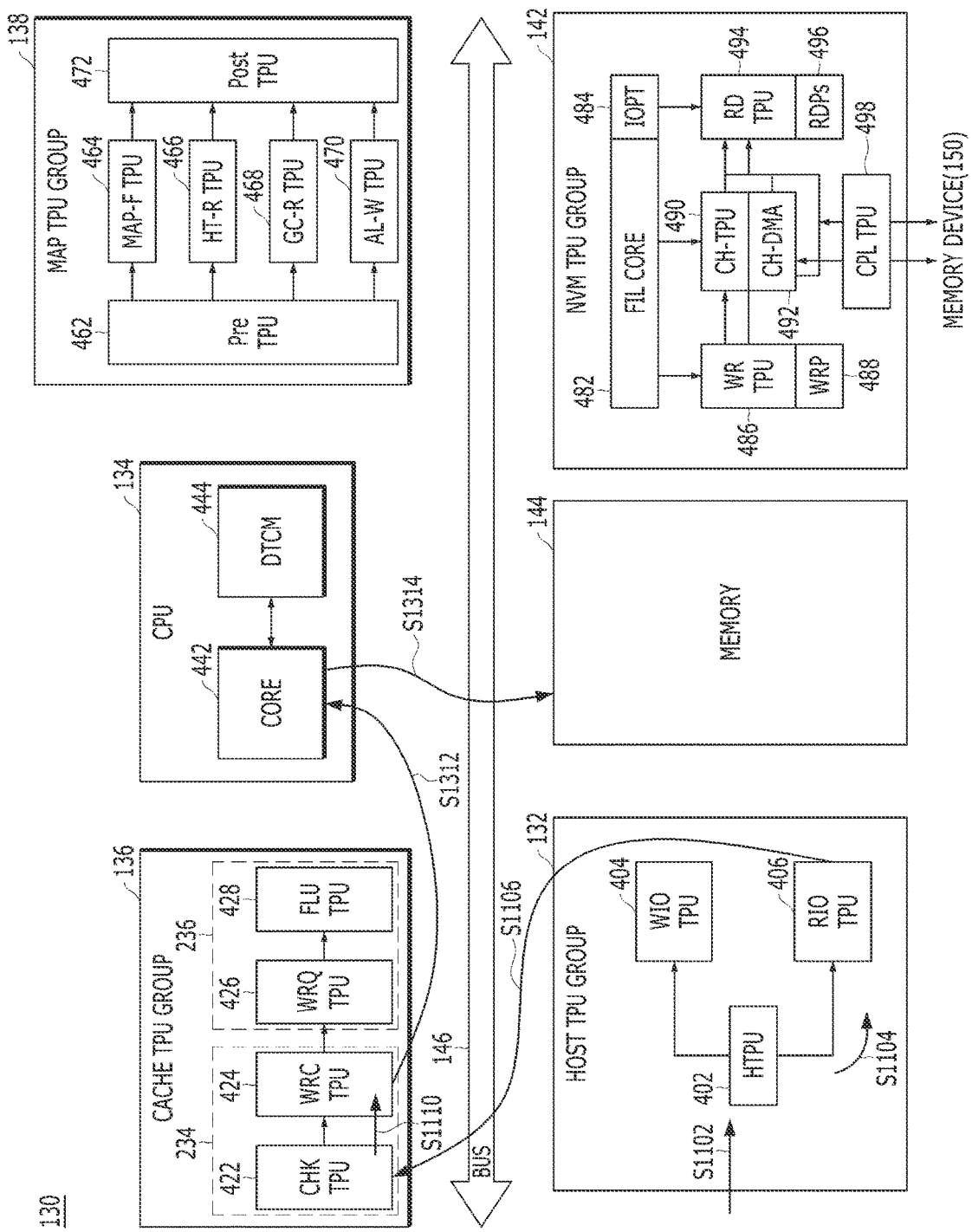

FIG. 13 illustrates an operation of the controller 130 when a read request has dependency on an uncompleted write request. FIG. 13 illustrates an operation of the controller 130 when the read request has dependency on an uncompleted trim request. The operation of FIG. 13 may correspond to steps S502, S504 and S510 which have been described with reference to FIG. 5.

Steps S1102 to S1106 and S1110 may be the same as steps S1102 to S1106 and S1110 described with reference to FIG. 11.

When the determination result of step S1110 indicates that the received read request has dependency on an uncompleted write request, the write cache TPU 424 may provide the core 442 with an exception signal for the received read request in step S1312.

In step S1314, the core 442 may search the memory 144 for data corresponding to the uncompleted write request in response to the exception signal, and provide the searched data to the host 102.

The operation of determining the dependency of the read request on the uncompleted write request and performing exception handling may prevent the problem that the memory system 110 provides wrong data to the host 102 in response to the read request.

In accordance with the present embodiment, the plurality of TPUs included in the controller 130 may configure a pipeline to perform a data I/O operation. Therefore, the throughput of the memory system 110 on the write and read operations can be improved.

When the plurality of TPUs constitute a pipeline, the throughput of the data I/O operation may be determined by the TPU which requires the longest request processing time. At least some of the plurality of TPUs may be configured in parallel to each other in order to shorten the processing time.

An example of the controller 130 in which at least some TPUs are configured in parallel will be described with reference to FIG. 14.

Figure 14:
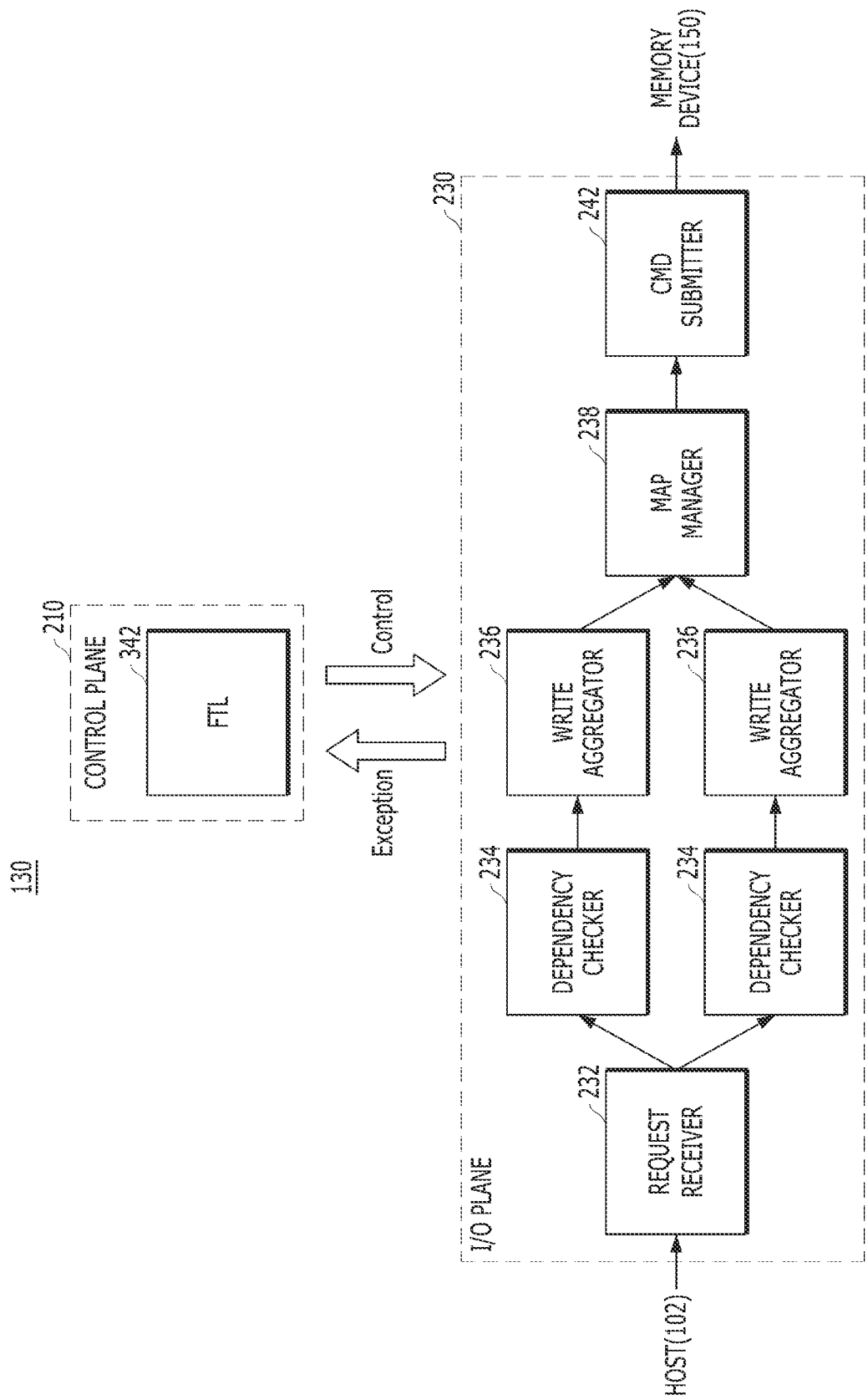
FIG. 14 is a diagram schematically illustrating a controller in accordance with an embodiment of the disclosed technology.

FIG. 14 is a diagram schematically illustrating a controller 130 in accordance with an embodiment.

As described with reference to FIG. 1, the controller 130 may include a control plane 210 and an I/O plane 230. The control plane 210 may perform the memory management operation described with reference to FIG. 1, and perform exception handling in the data I/O operation.

The I/O plane 230 may include a request receiver 232, a dependency checker 234, a write aggregator 236, a map manager 238 and an command submitter 242 as logical blocks. The logical blocks included in the I/O plane 230 correspond to those described with reference to FIG. 3.

The logical blocks may configure a pipeline for the data I/O operation. When the dependency checker 234 and the write aggregator 236 among the logical blocks occupy substantial amount of time to perform the data I/O operation, a bottleneck may occur in the dependency checker 234 and the write aggregator 236. When such a bottleneck occurs in the dependency checker 234 and the write aggregator 236, the throughput of the data I/O operation may be limited to the throughputs of the dependency checker 234 and the write aggregator 236.

Therefore, the controller 130 may include a plurality of dependency checkers 234 and a plurality of write aggregators 236, and the plurality of dependency checkers 234 and the plurality of write aggregators 236 may be configured to operate in parallel. For example, the controller 130 may include a plurality of cache TPU groups 136 which operate in parallel to each other. When the plurality of dependency checkers 234 and the plurality of write aggregators 236 operate in parallel, a bottleneck can be removed, and the throughput of the data I/O operation can be improved.

In accordance with some embodiments, the controller 130 may include the plurality of TPUs configured to perform the data I/O operation and the CPU configured to perform the memory management operation. The plurality of TPUs may configure a pipeline for the data I/O operation. The memory management operation may include an address mapping operation and a background operation. In accordance with some embodiments, the data I/O operation and the memory management operation may be performed in parallel, which makes it possible to improve the throughput of the memory system 110.

Although various embodiments have been described for illustrative purposes, various changes and modifications to the disclosed embodiments and other embodiments of the disclosed technology can be made based on what is disclosed and/or illustrated in this patent document.

What is claimed is:

1. A controller device for controlling a memory device, comprising:
   a request receiver configured to receive a request including a logical address from a host operatively coupled to the controller;
   a dependency checker configured to acquire the request from the request receiver and check a dependency of the request, the dependency indicating whether there exists any prior incomplete request that affects to processing of the request;
   a map manager configured to generate a command including a physical address mapped to the logical address of the request in response to a result of checking that the request has no dependency on the prior incomplete request; and
   a command submitter configured to provide the memory device with the command generated by the map manager,
   wherein the request receiver, the dependency checker, the map manager and the command submitter are structured to configure a data pipeline such that operations of the request receiver, the dependency checker, the map manager, and the command submitter are performed in series,
   wherein the map manager comprises:
   a host read tensor processing unit (TPU) configured to search for a physical address corresponding to the logical address of the request that corresponds to a read request; and
   a post TPU configured to generate a read command corresponding to the read request based on the searched physical address.

2. The controller device of claim 1, wherein the request receiver comprises:
   a host tensor processing unit (TPU) configured to determine a type of the request as a write request or a read request and provide the request to a write input/output (I/O) TPU or the read request a read I/O TPU based on the type of the request;
   the write I/O TPU configured to slice the write request into a plurality of requests, and provide the plurality of sliced requests to the dependency checker; and
   the read I/O TPU configured to provide the read request to the dependency checker.

3. The controller device of claim 1, wherein the command submitter comprises:
   a channel TPU configured to control a channel direct memory access (DMA) to provide the read command to the memory device;
   a read path TPU configured to control a read path to acquire read data corresponding to the read command from the memory device, and to perform error correction code (ECC) decoding on the acquired read data; and
   a flash interface layer (FIL) core configured to control the read path TPU and the channel TPU.

4. The controller device of claim 1, further comprising:
   a central processing unit (CPU) configured to perform an address mapping operation to generate map data by mapping a logical address of a host to a physical address of the memory device; and
   a memory configured to store a map table including the map data.

5. The controller device of claim 4, wherein the dependency checker comprises a check TPU configured to check the dependency of the request on an incomplete trim request and request the CPU to perform a corresponding operation to the request that has been checked as having dependency on the incomplete trim request.

6. The controller device of claim 5, wherein the check TPU is configured to check that the request has dependency on the incomplete trim request in case that the logical address of the request is same as the logical address of the uncompleted trim request.

7. The controller device of claim 5, wherein the CPU is configured to delay processing of the request until the incomplete trim request is completely processed in case that the request corresponds to a write request.

8. The controller device of claim 5, wherein the CPU is configured to provide, to the host, a response indicating that a logical address corresponding to the request has been trimmed.

9. The controller device of claim 4, wherein the dependency checker comprises a write cache TPU configured to request the CPU to perform a corresponding operation to the request that has been checked as having dependency on an incomplete write request.

10. The controller device of claim 9, wherein the write cache is configured to check that the request has dependency on the incomplete write request in case that the logical address of the request is same as the logical address of the uncompleted write request.

11. The controller device of claim 10, wherein the CPU is configured to delay processing of the request until the incomplete write request is completely processed in case that the request corresponds to a write request.

12. The controller device of claim 10, wherein the CPU is configured to search data associated with the incomplete write request in the memory in case that the request corresponds to a read request.

13. The controller device of claim 4, wherein the CPU is configured to determine a physical address of a memory region in the memory device, to which at least a part of the map table is to be programmed, and generate a map flush request including the physical address.

14. The controller device of claim 13, wherein the map manager comprises:
a map flush TPU configured to update the map table using the physical address determined by the CPU; and
a post TPU configured to generate a write command corresponding to the map flush request based on the determined physical address.

15. The controller device of claim 4, further comprising a write aggregator configured to aggregate write requests to stripe write data associated with write requests that have been checked as having no dependency on the prior incomplete request, and provide the CPU with an address mapping request for the aggregated write requests.

16. The controller device of claim 15, further comprising one or more dependency checkers and write aggregators, wherein the one or more dependency checkers are operated in parallel, and the one or more write aggregators are operated in parallel.

17. The controller device of claim 15, wherein the write aggregator comprises:
a write queue TPU configured to queue write requests acquired from the dependency checker; and
a flush TPU configured to aggregate the queued write requests by striping write data of the queued write request, and provide the aggregated write requests to the CPU.

18. The controller device of claim 17, wherein the flush TPU is configured to stripe the write data by determining some of addresses of data chunks included in the write data, the data chunks programmed to a plurality of memory dies included in the memory device.

19. The controller device of claim 15, wherein the CPU is configured to generate map data by mapping the logical addresses of the aggregated write requests to physical addresses of the memory device in response to the address mapping request.

20. The controller device of claim 15, wherein the map manager comprises:
a write TPU configured to update the map table using the map data generated by the CPU; and
a post TPU configured to generate a write command corresponding to the write request based on the mapped physical address.

21. The controller device of claim 20, wherein the command submitter comprises:
a write path TPU configured to control a write path to acquire write data corresponding to the write command, and to perform an error correction code encoding on the acquired write data;
a channel TPU configured to control a channel direct memory access (DMA) to provide the memory device with the write command and data from the write path; and
a flash interface layer (FIL) core configured to control the write path TPU and the channel TPU.

22. The controller device of claim 15, wherein the CPU is configured to i) determine a source block and destination block of a garbage collection operation, ii) generate a read request for the source block and provide the generated read request to the map manager, and iii) generate, in response to buffering in the memory of data associated with the read request, a write request for the destination block and provide the generated write request to the write aggregator.

23. The controller device of claim 22, wherein the map manager further comprises a garbage collection read TPU configured to search a physical address corresponding to the logical address of a garbage collection read request from the CPU by referring to the map table.

24. The controller device of claim 4, further comprising a host DMA configured to perform a data input/output (I/O) operation between the host and the memory without interventions of the CPU, the request receiver, the dependency checker, the map manager and the command submitter.

25. A controller device for controlling a memory device, comprising:
a request receiver configured to receive a request including a logical address from a host operatively coupled to the controller;
a dependency checker configured to acquire the request from the request receiver and check a dependency of the request, the dependency indicating whether there exists any prior incomplete request that affects to processing of the request;
a map manager configured to generate a command including a physical address mapped to the logical address of the request in response to a result of checking that the request has no dependency on the prior incomplete request; and
a command submitter configured to provide the memory device with the command generated by the map manager,
wherein the request receiver, the dependency checker, the map manager and the command submitter are structured to configure a data pipeline such that operations of the request receiver, the dependency checker, the map manager, and the command submitter are performed in series,
wherein the request receiver comprises:
a host tensor processing unit (TPU) configured to determine a type of the request as a write request or a read request and provide the request to a write input/output (I/O) TPU or the read request a read I/O TPU based on the type of the request;
the write I/O TPU configured to slice the write request into a plurality of requests, and provide the plurality of sliced requests to the dependency checker; and
the read I/O TPU configured to provide the read request to the dependency checker.

* * * * *